(12) United States Patent
Nakada et al.

(10) Patent No.: US 11,745,791 B2
(45) Date of Patent: Sep. 5, 2023

(54) CONTROL DEVICE FOR ON-BOARD DEVICE

(71) Applicant: HITACHI AUTOMOTIVE SYSTEMS, LTD., Hitachinaka (JP)

(72) Inventors: Mitsuaki Nakada, Atsugi (JP); Mitsuo Sasaki, Hadano (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 376 days.

(21) Appl. No.: 16/968,643

(22) PCT Filed: Jan. 24, 2019

(86) PCT No.: PCT/JP2019/002237
§ 371 (c)(1),
(2) Date: Aug. 10, 2020

(87) PCT Pub. No.: WO2019/176316
PCT Pub. Date: Sep. 19, 2019

(65) Prior Publication Data
US 2020/0406963 A1    Dec. 31, 2020

(30) Foreign Application Priority Data

Mar. 13, 2018 (JP) .................. 2018-045778

(51) Int. Cl.
*H02M 3/158* (2006.01)
*B62D 5/04* (2006.01)
*H02P 27/06* (2006.01)

(52) U.S. Cl.
CPC ............ *B62D 5/0484* (2013.01); *H02P 27/06* (2013.01)

(58) Field of Classification Search
CPC .......... B62D 5/0484; H02P 27/06; H02H 9/02
See application file for complete search history.

(56) References Cited

U.S. PATENT DOCUMENTS 5,250,756 A    10/1993  Swift
2017/0272009 A1*  9/2017  Kawamura ........... B60L 3/0046
(Continued)

FOREIGN PATENT DOCUMENTS

JP    H05-315024 A    11/1993
JP    2014-187730 A   10/2014
(Continued)

OTHER PUBLICATIONS

International Search Report with English translation and Written Opinion issued in corresponding application No. PCT/JP2019/002237 dated Apr. 2, 2019.

*Primary Examiner* — Muhammad S Islam
(74) *Attorney, Agent, or Firm* — FOLEY & LARDNER LLP

(57) ABSTRACT

A control device for an on-board device including an actuator is configured to: supply power to a first microprocessor and a first driver circuit from a first power source through a first power supply path; supply power to a second microprocessor and a second driver circuit from a second power source through a second power supply path; and use the first and second driver circuits to drive the actuator. In this control device, the negative electrodes of the first and second power sources are electrically connected to a common ground portion. Specifically, the first negative electrode of the first power source and the second negative electrode of the second power source are connected to the common ground portion respectively through independent first and second connector portions.

18 Claims, 16 Drawing Sheets

(56) References Cited

U.S. PATENT DOCUMENTS

2019/0334466 A1* 10/2019 Arai .................. H02P 27/12
2019/0363664 A1* 11/2019 Nakamura ............. B62D 5/046

FOREIGN PATENT DOCUMENTS

| JP | 2015-061458 A | 3/2015 |
| JP | 2017-099170 A | 6/2017 |
| JP | 2017-169405 A | 9/2017 |

* cited by examiner

CONTROL DEVICE FOR ON-BOARD DEVICE

TECHNICAL FIELD

The present invention relates to a control device for an on-board device having a redundant configuration.

BACKGROUND ART

Safety and reliability are key requirements for on-board devices which are designed to be installed in vehicles. These requirements are becoming more and more stringent in concert with recent efforts toward practical application of automated driving. One measure to address the requirements is constructing an on-board device to have a redundant configuration so that the on-board device is maintained controllable even after a fault or failure has occurred therein.

For example, Patent Document 1 discloses using two separate driver circuit systems to control and drive a motor having two coil sets so as to maintain the motor drive operation even after any one of the driver circuit systems has failed.

Patent Document 2 discloses a more reliable technique using two separate driver circuit systems, each individually supplied with power from one of two power sources through one of two power supply routes to control and drive a motor having two coil sets.

REFERENCE DOCUMENT LIST

Patent Document
  Patent Document 1: JP 2015-61458 A
  Patent Document 2: JP 2017-99170 A

SUMMARY OF THE INVENTION

Problem to be Solved by the Invention

A motor control device including two independent energizing systems as disclosed in Patent Document 2 have higher reliability than a motor control device powered by a single power source. However, such control devices are likely to experience variations (difference) in ground potential, which may act as a constraint on information communication between these energizing systems. Furthermore, in the motor control device as disclosed in Patent Document 2, if one of the energizing systems loses its capability to discharge ground current to the ground portion of the vehicle, the motor control device will lose all the functions related to the energizing system. For this reason, circuits in the motor control device should be designed in consideration of variations in ground potential among the systems, which requires more challenging design engineering.

The above problem may be avoided by configuring the two energizing systems to share a common ground portion. However, with this configuration, if one of the energizing systems has failed and loses its capability to discharge ground current, all ground current will concentrate at the grounding components of the other energizing system, and the current exceeding the maximum allowable current limit may flow through some grounding components, such as a ground harness.

The present invention has been made in view of the above circumstances, and an object of the present invention is to provide a control device for an on-board device to be installed in a vehicle, capable of preventing or reducing variations in ground potential and preventing or reducing damage that may otherwise be caused by unequal ground current distribution when a fault has occurred in a ground portion of the vehicle.

Means for Solving the Problem

According to an aspect of the present invention, a control device for an on-board device to be installed in a vehicle and including an actuator is configured to: supply power to a first microprocessor and a first driver circuit from a first power source through a first power supply path; supply power to a second microprocessor and a second driver circuit from a second power source through a second power supply path; and use the first and second driver circuits to drive the actuator. In this control device, the negative electrodes of the first and second power sources are electrically connected to a common ground portion. Specifically, the first negative electrode of the first power source and the second negative electrode of the second power source are connected to the common ground portion respectively through independent first and second connector portions.

Effects of the Invention

According to the present invention, the first and second microprocessors and the first and second driver circuits are connected to the common ground portion. Thus, variations in ground potential are reduced or prevented. Furthermore, even if one of the connector portions has failed so that related terminals are short-circuited, the control device is able to maintain its functionality with only the loss of independence between the energizing systems for two coil sets. Furthermore, since the first and second connector portions are independent from each other, wiring harnesses used as power harnesses may be of different types and/or different diameters from those used as ground harnesses, thus ensuring an improved degree of freedom in designing the control device. Additionally, the first and second negative terminals may have current capacities greater than the first and second positive terminals. This configuration is able to prevent or reduce ground harness damage even if a fault such as accidental unplugging of any connector portion or breakage of one of the ground harnesses has occurred and all ground current concentrates at the ground harness.

MODES FOR CARRYING OUT THE INVENTION

An embodiment of the present invention will be described with reference to the drawings below.

Figure 1:
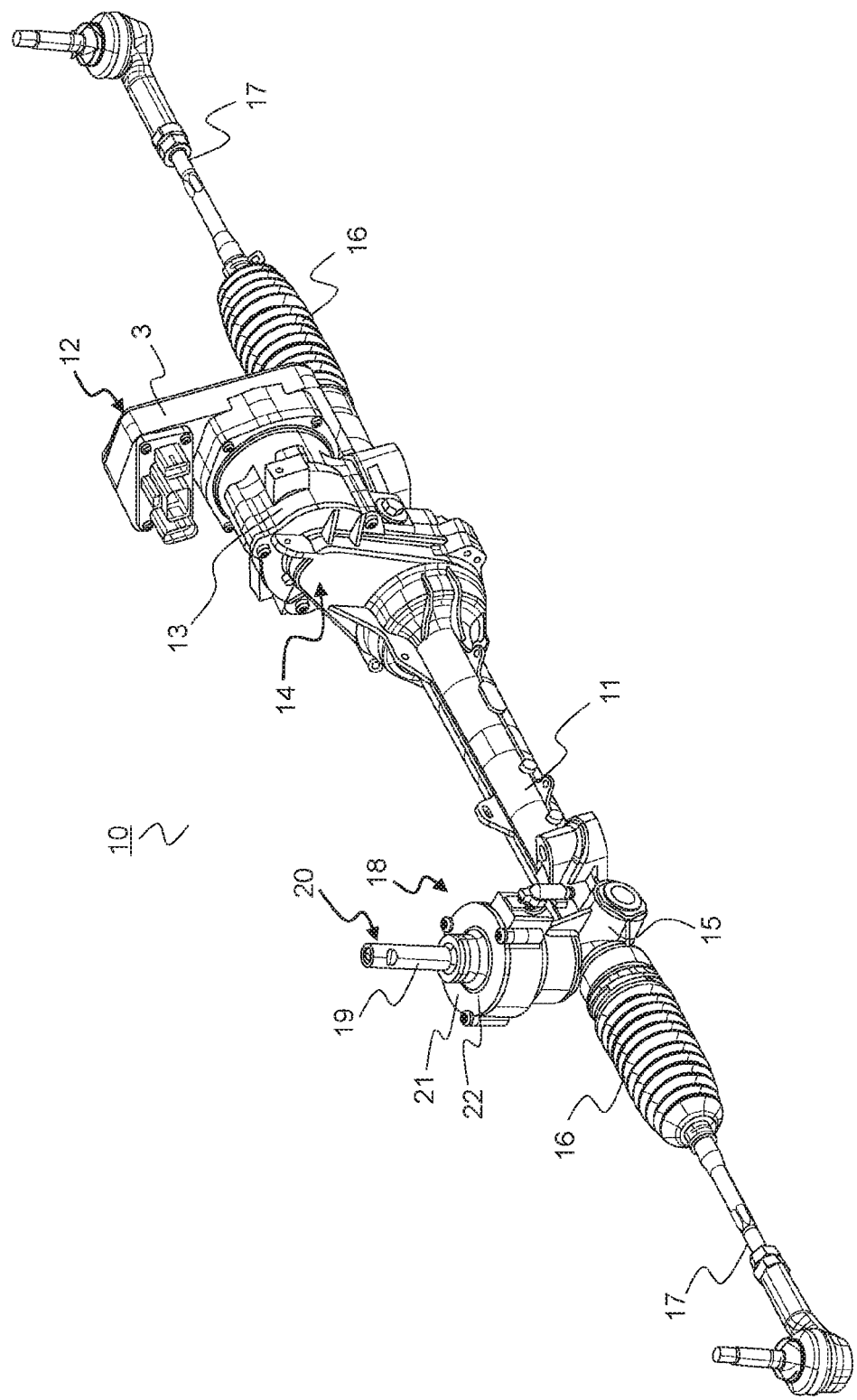
FIG. 1 is a perspective view of an electric power steering device, which is an example of an on-board device.

FIG. 1 illustrates a schematic configuration of an electric power steering (EPS) device, which is an example of an on-board device to which the present invention is applied. An electric power steering device 10 includes a rack housing 11, a motor housing 12, an electric motor (three-phase brushless motor) 13 having two coil sets, a reduction drive 14, a pinion 15, dust boots 16, 16, tie rods 17, 17, and a steering mechanism 18, and the like.

Rack housing 11 houses a pinion shaft (not shown), a rack bar (not shown), and a portion of a steering shaft 19. Motor housing 12 houses electric motor 13 and an electronic control unit (ECU) for EPS control (referred to as "EPS ECU" below) 3. The rotation of electric motor 13 is decelerated by reduction drive 14 and the decelerated rotation is transmitted to steering mechanism 18. Thereby, steering mechanism 18 assists the driver of the vehicle in applying a steering force to the steered wheels.

Steering mechanism 18 includes steering shaft 19, the pinion shaft, and a torsion bar. Steering shaft 19 rotates integrally with the steering wheel. Steering torque sensors 21 and steering angle sensors 22, which serves as driving condition sensors for sensing a steering state of steering mechanism 18, are mounted on a steering axle 20. Specifically, a pair of steering torque sensors 21 and a pair of steering angle sensors 22 are mounted. Steering torque sensors 21 are each configured to measure, based on an amount of torsion of the torsion bar, a steering torque (torsion bar torque) generated in steering mechanism 18. Steering angle sensors 22 are each configured to measure a steering angle caused by a steering operation.

The pinion shaft is coupled to steering shaft 19 with the torsion bar interposed therebetween. Dust boots 16, 16 are made of rubber or the like, and each is formed in a cylindrical bellows shape. The outer ends, in the vehicle width direction, of dust boots 16, 16 are fixed to the inner ends, in the vehicle width direction, of tie rods 17, 17. The inner ends of the pair of tie rods 17, 17 are coupled to the opposite ends of the rack bar.

Figure 2:
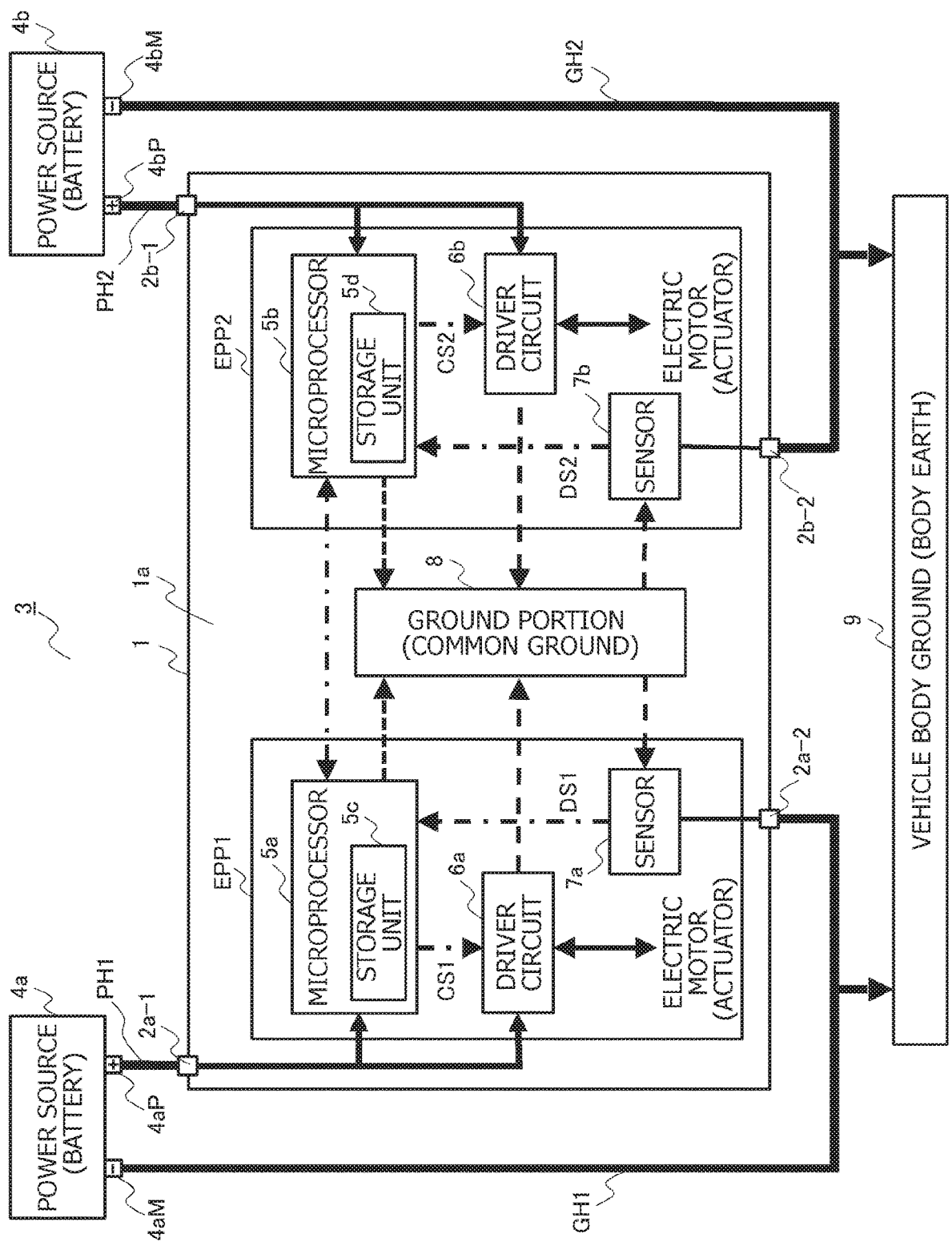
FIG. 2 is a block diagram of a control device for an on-board device according to an embodiment of the present invention, showing not all components, but showing main power supply-related components of the EPS ECU.

FIG. 2 illustrates a control device for an on-board device according to an embodiment of the present invention. FIG. 2 does not show all components, but does show main power supply-related components of EPS ECU 3. EPS ECU 3 has a redundant configuration, and includes a first-system drive unit EPP1 (drive unit EPP1 in a first energizing system for coil set 13a of electric motor 13) and a second-system drive unit EPP2 (drive unit EPP2 in a second energizing system for coil set 13b of electric motor 13). EPS ECU 3 has a housing 1. First-system drive unit EPP1 and second-system drive unit EPP2 are housed in an electronic device housing space 1a of housing 1.

Housing 1 includes a first connector portion and a second connector portion. The first connector portion includes a first positive terminal 2a-1 and a second positive terminal 2b-1. The second connector portion includes a first negative terminal 2a-2 and a second negative terminal 2b-2. First positive terminal 2a-1 is connected to a positive electrode 4aP of a first power source (battery) 4a through a power harness PH1. Second positive terminal 2b-1 is connected to a positive electrode 4bP of a second power source 4b through a power harness PH2. First negative terminal 2a-2 is connected, through a ground harness GH1, to a negative electrode 4aM of first power source 4a and to a vehicle body ground (grounding member of the vehicle) 9. Second negative terminal 2b-2 is connected, through a ground harness GH2, to a negative electrode 4bM of second power source 4b and to vehicle body ground 9. The first and second connector portions are configured so that the current capacity of first negative terminal 2a-2 is greater than the current capacity of first positive terminal 2a-1, and the current capacity of second positive terminal 2b-1 is greater than the current capacity of second negative terminal 2b-2.

First-system drive unit EPP1 includes a first microprocessor 5a, a first driver circuit 6a, and a first sensor 7a. Second-system drive unit EPP2 includes a second microprocessor 5b, a second driver circuit 6b, and a second sensor 7b.

First microprocessor 5a is connected between positive electrode 4aP of first power source 4a and a ground portion (common ground) 8. First microprocessor 5a is supplied with power from first power source 4a and is configured to output a first command signal CS1 for controlling first driver circuit 6a. Second microprocessor 5b is connected between second power source 4b and ground portion 8. Second microprocessor 5b is supplied with power from second power source 4b and is configured to output a second command signal CS2 for controlling second driver circuit 6b.

First microprocessor 5a is configured to detect a fault of the control device based on an output signal DS1 from first sensor 7a, and includes a storage unit 5c having a non-volatile memory. Second microprocessor 5b is configured to detect a fault of the control device based on an output signal DS2 from second sensor 7b, and includes a storage unit 5d having a non-volatile memory. Storage units 5c, 5d are configured to store a fault record in fault history of the second connector portion when either first or second microprocessor 5a, 5b determines that there is a fault in the second connector portion.

First driver circuit 6a is connected between positive electrode 4aP of first power source 4a and ground portion 8 and is supplied with power from first power source 4a. First driver circuit 6a includes a first inverter configured to drive and control electric motor (actuator) 13. Second driver circuit 6b is connected between positive electrode 4bP of second power source 4b and ground portion 8 and is supplied with power from second power source 4b. Second driver circuit 6b includes a second inverter configured to drive and control electric motor 13.

Ground portion 8 is formed of an electrically conductive material and serves as a common ground for first and second microprocessors 5a, 5b and first and second driver circuits 6a, 6b.

Figure 3:
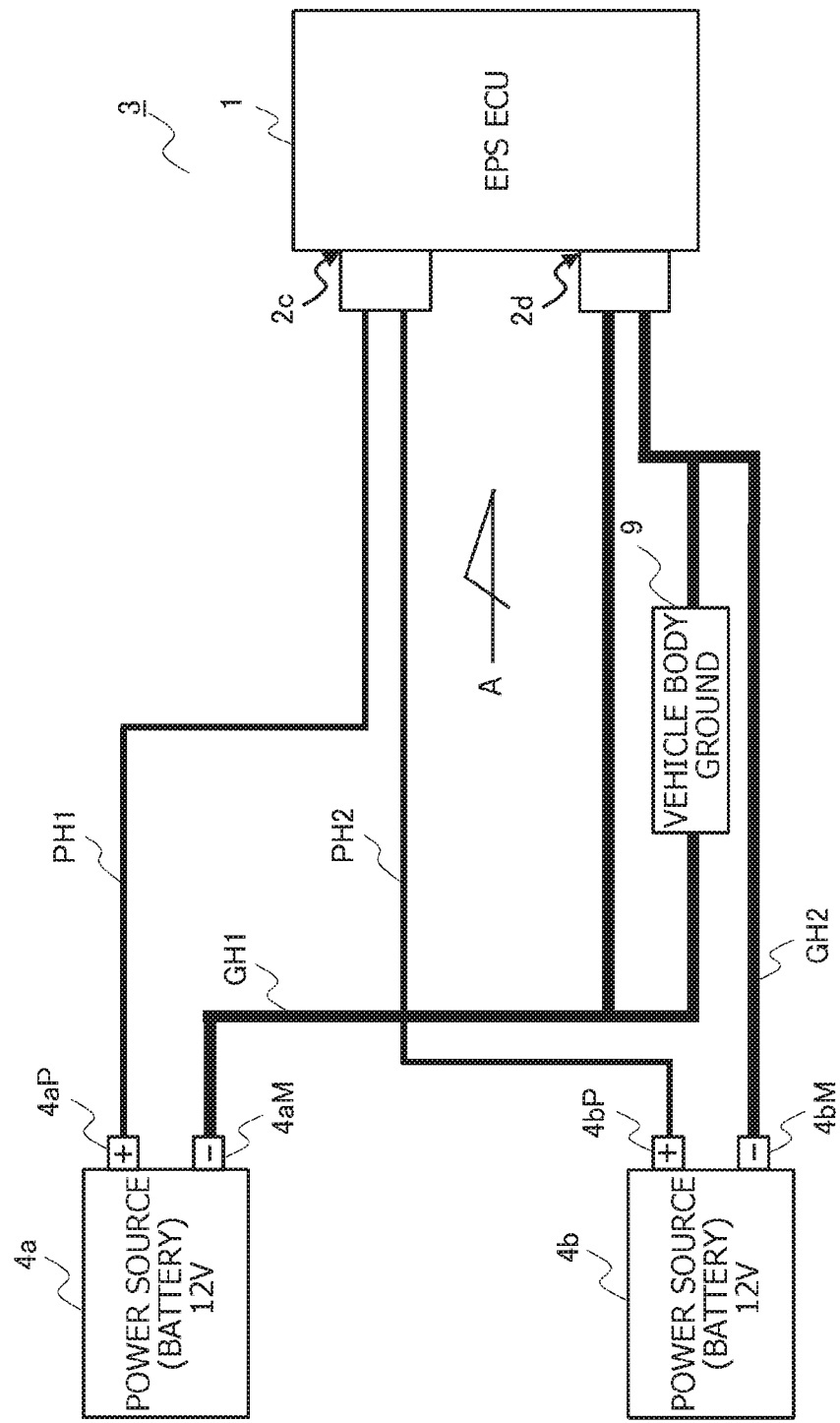
FIG. 3 is a schematic view of a connection example between the EPS ECU and the first and second power sources shown in FIG. 2.
Figure 4:
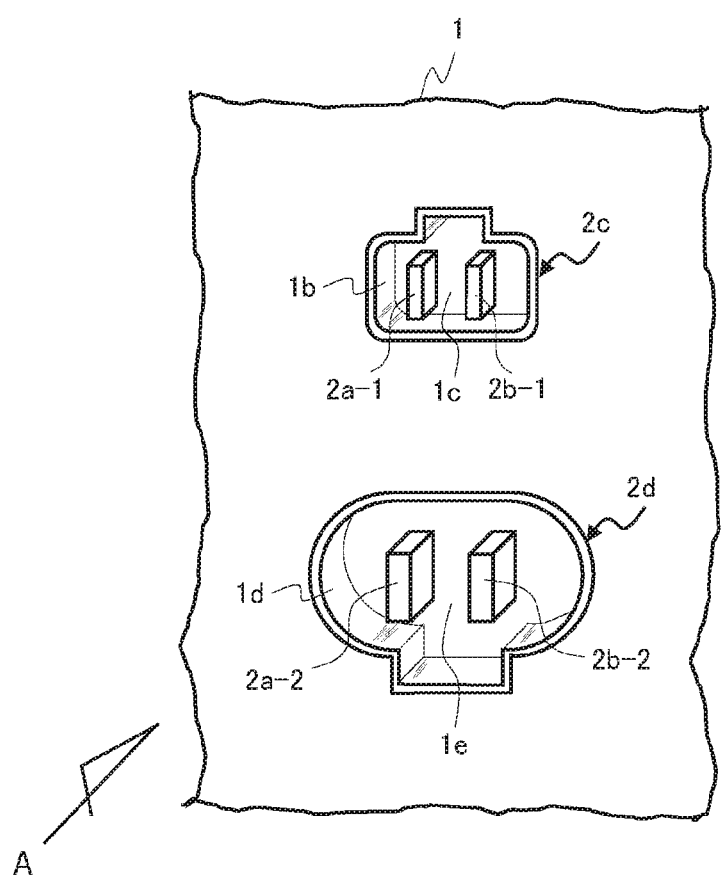
FIG. 4 is a perspective exterior view of jacks of the first and second connector portions of FIG. 3.

FIG. 3 is a schematic view of a connection example between the EPS ECU and the first and second power sources shown in FIG. 2. FIG. 4 is a perspective exterior view of jacks of the first and second connector portions of FIG. 3. This connection example may be applicable to a configuration in which the voltages of first and second power sources (batteries) 4a, 4b are the same as each other, e.g., both set to 12V.

As shown in FIG. 3, first and second connector portions 2c, 2d are separately provided to housing 1 of EPS ECU 3. EPS ECU 3 is configured to be supplied with power from first power source 4a through power harness PH1 and ground harness GH1 and supplied with power from second power source 4b through power harness PH2 and ground harness GH2, by means of plugs (not shown) inserted into the jacks of first and second connector portions 2c, 2d. The plugs have shapes that conform to the respective jacks.

Wiring harnesses used as ground harnesses GH1, GH2 have a greater ampacity than wiring harnesses used as power harnesses PH1, PH2 so that ground harnesses GH1, GH2 are able to withstand the heat generated by ground currents conducting therethrough from first and second power sources 4a, 4b. For example, wiring harnesses used as ground harnesses GH1, GH2 may be the same type and have the same diameter. Wiring harnesses used as power harnesses PH1, PH2 may be the same type and have the same diameter. Furthermore, the diameter of each ground harness GH1, GH2 is greater than the diameter of each power harness PH1, PH2. Similarly, the plug and jack for ground harnesses GH1, GH2 have greater cross-sectional areas and greater contact areas than those for power harnesses PH1, PH2 so that the plug and jack for ground harnesses GH1, GH2 have a greater ampacity than those for power harnesses PH1, PH2.

As shown in FIG. 4, first connector portion 2c has a jack including a bottomed hole 1b formed in housing 1, and first and second positive terminals 2a-1, 2b-1 erected on bottom surface 1c of bottomed hole 1b. First positive terminal 2a-1 is connected to positive electrode 4aP of first power source 4a through power harness PH1. Second positive terminal 2b-1 is connected to positive electrode 4bP of second power source 4b through power harness PH2.

Second connector portion 2d has a jack including a bottomed hole 1d formed in housing 1, and first and second negative terminals 2a-2, 2b-2 erected on bottom surface 1e of bottomed hole 1d. First negative terminal 2a-2 is connected to negative electrode 4aM of first power source 4a through ground harness GH1. Second negative terminal 2b-2 is connected to negative electrode 4bM of second power source 4b through ground harness GH2. Ground harnesses GH1, GH2 are both connected to vehicle body ground 9.

As shown in FIG. 4, first connector portion 2c configured to be connected to positive electrodes 4aP, 4bP of first and second power sources 4a, 4b have a shape different from that of second connector portion 2d configured to be connected to negative electrodes 4aM, 4bM of first and second power sources 4a, 4b. In other words, the shape of first connector portion 2c as viewed from the direction of arrow A is different from the shape of second connector portion 2d as viewed from the direction of arrow A, thereby structurally preventing wiring connection error.

As used herein, the direction in which positive electrode 4aP of first power source 4a is connected to first positive terminal 2a-1 (direction of arrow A) will be referred to as the "mounting direction". Then, the cross section, perpendicular to the mounting direction, of first positive terminal 2a-1 differs in shape from the cross section, perpendicular to the mounting direction, of first negative terminal 2a-2. The cross section, perpendicular to the mounting direction, of second positive terminal 2b-1 differs in shape from the cross section, perpendicular to the mounting direction, of second negative terminal 2b-2.

As used herein, cross sections "differing in shape" refer not only to cross sections having different geometries from each other, but also refer to cross sections having the same geometry but are of different size.

Furthermore, the cross-sectional area, perpendicular to the mounting direction, of first negative terminal 2a-2 is larger than the cross-sectional area, perpendicular to the mounting direction, of first positive terminal 2a-1. The cross-sectional area, perpendicular to the mounting direction, of second negative terminal 2b-2 is larger than the cross-sectional area, perpendicular to the mounting direction, of second positive terminal 2b-1.

Figure 5:
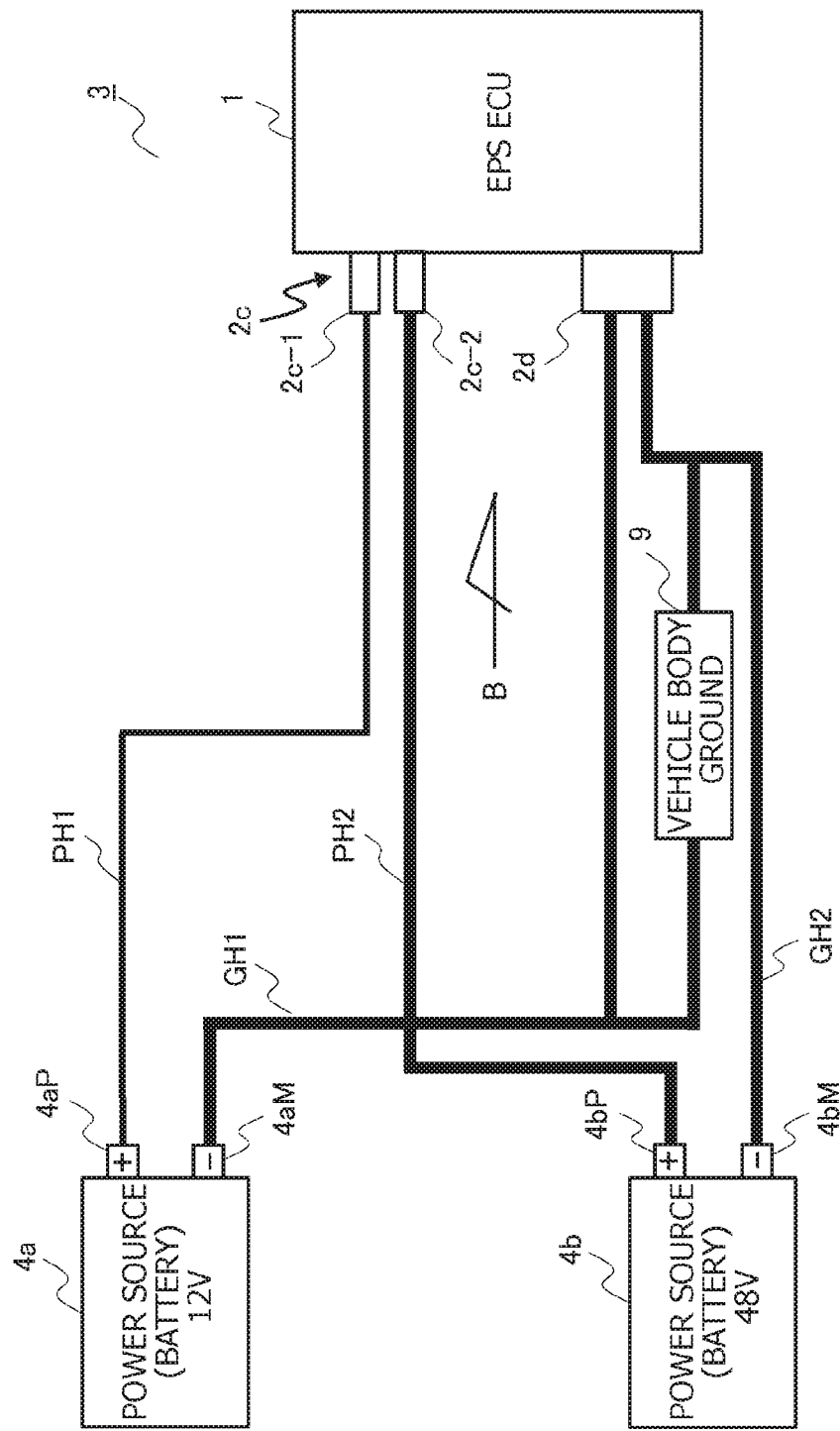
FIG. 5 is a schematic view of another connection example between the EPS ECU and the first and second power sources shown in FIG. 2.
Figure 6:
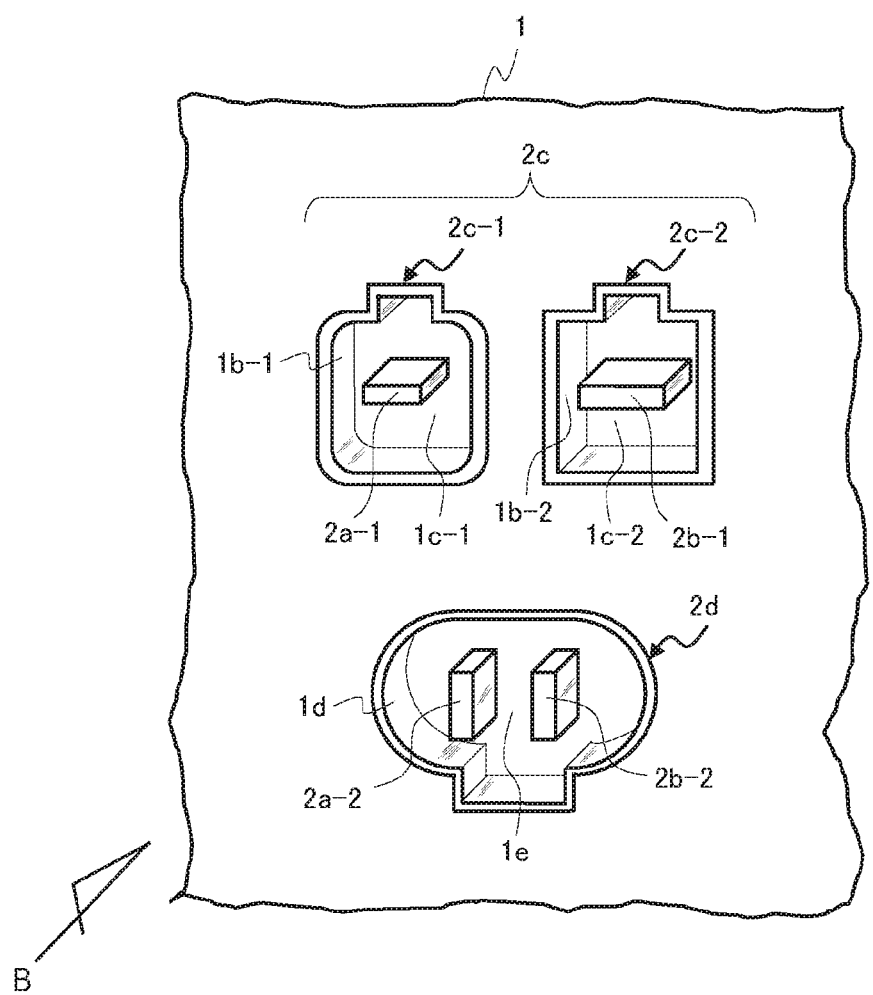
FIG. 6 is a perspective exterior view of jacks of the first and second connector portions of FIG. 5.

FIG. 5 is a schematic view of another connection example between the EPS ECU and the first and second power sources shown in FIG. 2. FIG. 6 is a perspective exterior view of jacks of the first and second connector portions of FIG. 5. This connection example may be applicable to a configuration in which the voltages of first and second power sources (batteries) 4a, 4b differ from each other, e.g., assumed to be set to 12V and 48V, respectively.

In this example, first and second connector portions 2c, 2d are provided to housing 1 of EPS ECU 3, as shown in FIG. 5. First connector portion 2c is divided into a first connector 2c-1 for first positive terminal and a first connector 2c-2 for second positive terminal. EPS ECU 3 is configured to be supplied with power from first power source 4a through power harness PH1 and ground harness GH1 and supplied with power from second power source 4b through power harness PH2 and ground harness GH2, by means of plugs (not shown) inserted into the jacks of first connector 2c-1 for first positive terminal, first connector 2c-2 for second positive terminal, and second connector portion 2d. The plugs have shapes that conform to the respective jacks.

Wiring harnesses used as ground harnesses GH1, GH2 have a greater ampacity than wiring harnesses used as power harnesses PH1, PH2 so that ground harnesses GH1, GH2 are able to withstand the heat generated by ground currents conducting therethrough from first and second power sources 4a, 4b. Furthermore, since the voltage (48V) applied to power harness PH2 is expected to be higher than the voltage applied to power harness PH1, a wiring harness used as power harness PH2 has a greater ampacity than a wiring harness used as power harness PH1. For example, wiring harnesses used as ground harnesses GH1, GH2 may be the same type as wiring harnesses used as power harnesses PH1, PH2 but have a greater diameter than the wiring harnesses used as power harnesses PH1, PH2. Furthermore, a wiring harness used as power harness PH2 may be the same type as a wiring harness used as power harness PH1 but have a greater diameter than a wiring harness used as power harness PH1. That is, the diameters of harnesses PH1, PH2, GH1, GH2 satisfy "GH1=GH2>PH2>PH1".

As shown in FIG. 6, first connector 2c-1 for first positive terminal has a jack including a bottomed hole 1b-1 formed in housing 1, and first positive terminal 2a-1 erected on bottom surface 1c-1 of bottomed hole 1b-1. First connector 2c-2 for second positive terminal has a jack including a bottomed hole 1b-2 formed in housing 1, and second positive terminal 2b-1 erected on bottom surface 1c-2 of bottomed hole 1b-2. First positive terminal 2a-1 is connected to positive electrode 4aP of first power source 4a through power harness PH1. Second positive terminal 2b-1 is connected to positive electrode 4bP of second power source 4b through power harness PH2.

Second connector portion 2d has a jack including a bottomed hole 1d formed in housing 1, and first and second negative terminals 2a-2, 2b-2 erected on bottom surface 1e of bottomed hole 1d. First negative terminal 2a-2 is connected to negative electrode 4aM of first power source 4a through ground harness GH1. Second negative terminal 2b-2 is connected to negative electrode 4bM of second power source 4b through ground harness GH2. Ground harnesses GH1, GH2 are both connected to vehicle body ground 9.

As shown in FIG. 6, first connector 2c-1 for first positive terminal and first connector 2c-2 for second positive terminal in first connector portion 2c configured to be connected respectively to positive electrodes 4aP, 4bP of first and second power sources 4a, 4b, and second connector portion 2d configured to be connected to negative electrodes 4aM, 4bM of first and second power sources 4a, 4b have shapes different from each other. In other words, first connector 2c-1 for first positive terminal, first connector 2c-2 for second positive terminal, and second connector portion 2d have shapes that are different from each other when viewed from the direction of arrow B, thereby structurally preventing wiring connection error.

As used herein, cross sections "differing in shape" refer not only to cross sections having different geometries from each other, but also refer to cross sections having the same geometry but are of different size.

As described above, even in a configuration that uses power sources with different supply voltages, wiring harnesses of the same type and the same diameter may be used for ground harnesses GH1, GH2. This allows equal ground current distribution between ground harnesses GH1, GH2 and eliminates the need for using different types of terminals for the grounding terminals, i.e., first and second negative terminals 2a-2, 2b-2, depending on the different supply voltages of the power sources connected thereto.

As used herein, "first and second connector portions 2c, 2d are separately provided" also encompasses the state satisfying the following conditions (1) and (2), for example.

(1) The plug of power harness PH1 adapted to be connected to first connector portion 2c is separated from the plug of ground harness GH1 adapted to be connected to second connector portion 2d.

(2) First and second positive terminals 2a-1, 2b-1 are surrounded by a common enclosure made of an insulating material, and first and second negative terminals 2a-2, 2b-2 are not placed in (i.e., are disposed outside) the enclosure that surrounds first and second positive terminals 2a-1, 2b-1. First and second positive terminals 2a-1, 2b-1 may be surrounded by another common enclosure or surrounded separately by separate enclosures.

Figure 7:
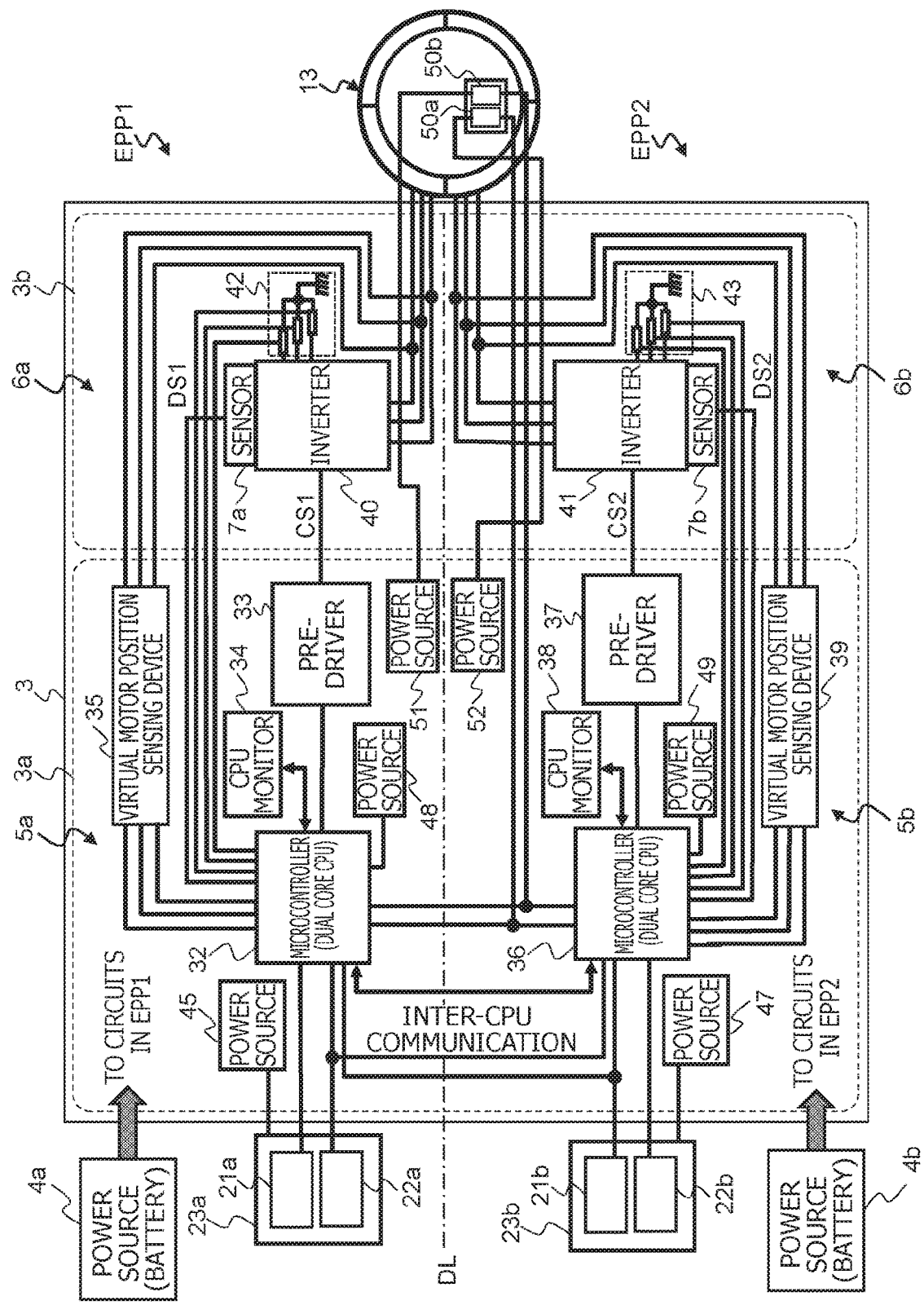
FIG. 7 is a block diagram illustrating a configuration example of the EPS ECU shown in FIG. 2.

FIG. 7 illustrates a configuration example of EPS ECU 3 shown in FIG. 2. EPS ECU 3 has a logic circuit 3a implemented on a printed circuit board and a power circuit 3b implemented on a metal printed circuit board. Logic circuit 3a operates at an internal power supply voltage generated by stepping down the external power supply voltages supplied from first and second power sources 4a, 4b. Power circuit 3b operates at the external power supply voltages supplied from first and second power sources 4a, 4b. A power management IC or the like is used to step down the external power supply voltages to the internal power supply voltage. In this embodiment, the metal printed circuit board is used to implement power circuit 3b in order to facilitate heat dissipation from power supply-related devices that tend to generate a large amount of heat, and to ensure the thermal reliability of electronic components in EPS ECU 3.

Logic circuit 3a functions as a processor and corresponds to first and second microprocessors 5a, 5b in FIG. 2. Power circuit 3b corresponds to first and second driver circuits 6a, 6b in FIG. 2. The circuitry including logic circuit 3a and power circuit 3b is divided into first-system drive unit EPP1 and second-system drive unit EPP2 along dashed-dotted line DL of FIG. 7.

First microprocessor 5a includes a first microcontroller (dual core CPU in this embodiment) 32, a pre-driver 33, a CPU monitor 34, a virtual motor position sensing device (inductance sensing device) 35, and the like. Second microprocessor 5b includes a second microcontroller (dual core CPU in this embodiment, a pre-driver 37, a CPU monitor 38, a virtual motor position sensing device (inductance sensing device) 39, and the like.

First driver circuit 6a includes a first inverter 40 and a first current measuring unit 42, which is a three-shunt based current sensor. First current measuring unit 42 is used as a motor phase current sensor and a primary-side current sensor. Second driver circuit 6b includes a second inverter 41 and a second current measuring unit 43, which is a three-shunt based current sensor. Second current measuring unit 43 is used as a motor phase current sensor and a primary-side current sensor.

In addition, first sensor 7a for ground current monitoring is provided to first inverter 40 at a point between ground portion 8 and first negative terminal 2a-2. Power having a current or voltage value measured by first sensor 7a is supplied to microcontroller 32. Second sensor 7b is provided to second inverter 41 at a point between ground portion 8 and second negative terminal 2b-2. Power having a current or voltage value measured by second sensor 7b is supplied to microcontroller 36.

First and second microcontrollers 32, 36 are each configured to: perform arithmetic operations for EPS assist control; control motor current (current supplied to electric motor 13); detect any fault of the functional components; and perform safe mode shift processing, for example. Power supply voltages of internal operation power sources 48, 49 are applied to first and second microcontrollers 32, 36, respectively. CPU monitor 34 is configured to detect any fault that has occurred in microcontroller 32, and to disconnect the power supply to microcontroller 32 when detecting any fault. CPU monitor 38 is configured to detect any fault that has occurred in microcontroller 36, and to disconnect the power supply to microcontroller 36 when detecting any fault. Pre-driver 33 is configured to drive driver elements in inverter 40 based on a command from microcontroller 32. Pre-driver 37 is configured to drive driver elements in inverter 41 based on a command from microcontroller 36.

Each of inverters 40, 41 includes driver elements for supplying a current to electric motor 13. Inverter 40 operates based on a command signal CS1 from pre-driver 33. Inverter 41 operates based on a command signal CS2 from pre-driver 37. Electric motor 13, which has two coil sets, is driven with the motor currents from inverters 40, 41 so as to generate a motor torque for assisting steering force.

Current measuring units 42, 43 are configured to monitor whether the motor currents from inverters 40, 41 have target electric-current values required in motor control so as to ensure that a required torque for electric motor 13 calculated in the assist control is reliably output. Current measuring units 42, 43 are further configured to monitor primary-side currents (currents input from first and second power sources 4a, 4b to drive units EPP1, EPP2).

A first steering sensor unit 23a (including steering torque sensor 21a and steering angle sensor 22a) for drive unit EPP1 is applied with the power supply voltage of an internal operation power source 45 in logic circuit 3a, and is configured to provide sensing outputs to first and second microcontrollers 32, 36. A second steering sensor unit 23b (including steering torque sensor 21b and steering angle sensor 22b) for drive unit EPP2 is applied with the power supply voltage of an internal operation power source 47 in logic circuit 3a, and is configured to provide sensing outputs to second and first microcontrollers 36, 32.

Each of steering torque sensors 21a, 21b and steering angle sensors 22a, 22b may be a dual sensor configured to provide separate outputs for cores in each dual core CPU. Each of first and second microcontrollers 32, 36 includes an inter-microcomputer communication unit configured to establish inter-microcomputer communication (inter-CPU communication) to exchange status signals and sensor signals between first and second microcontrollers 32, 36.

Electric motor 13 is provided with motor rotation angle sensors (dual motor position sensors) 50a, 50b mounted on a printed circuit board. Motor rotation angle sensor 50a is applied with the power supply voltage of an internal operation power source 52 provided in logic circuit 3a, and is configured to provide sensing outputs to first and second microcontrollers 32, 36. Motor rotation angle sensor 50b is applied with the power supply voltage of an internal operation power source 51 provided in logic circuit 3a, and is configured to provide sensing outputs to first and second microcontrollers 32, 36.

Based on a three-phase current value measured by current measuring unit 42, a rotor rotational position detected by virtual motor position sensing device 35, a motor rotation angle detected by motor rotation angle sensors 50a, 50b, the output signal DS1 from first sensor 7a, and the like, first microcontroller 32 generates a pulse signal for performing pulse width modulation (PWM) control. First microcontroller 32 outputs the pulse signal to pre-driver 33.

Based on a phase current value measured by current measuring unit 43, a rotor rotational position detected by virtual motor position sensing device 39, a motor rotation angle detected by motor rotation angle sensors 50a, 50b, the output signal DS2 from second sensor 7b, and the like, second microcontroller 36 generates a pulse signal for performing PWM control. Second microcontroller 36 outputs the pulse signal to pre-driver 37.

The operation of first microcontroller 32 is assessed by CPU monitor 34. The operation of second microcontroller 36 is assessed by CPU monitor 38. CPU monitors 34, 38, each including, for example, a timer known as "watchdog", constantly monitor whether first and second microcontrollers 32, 36 operate properly.

Pre-drivers 33, 37 output the first and second command signals (PWM signals) CS1, CS2 to inverters 40, 41, respectively, and electric motor 13 is driven with the motor currents from inverters 40, 41. Current measuring units 42, 43 measure three-phase currents generated while electric motor 13 is driven, and provide the resultant measurement signals to first and second microcontrollers 32, 36 so that first and second microcontrollers 32, 36 use these measurement signals to perform feedback control. Based on the three-phase currents, first and second microcontrollers 32, 36 calculate the total amount of currents supplied from first and second power sources 4a, 4b. Virtual motor position sensing devices 35, 39, each of which measures a rotor rotational position based on a voltage at the neutral point of the stator coil, provide the resultant measurement signals to first and second microcontrollers 32, 36. The measurement signals from virtual motor position sensing devices 35, 39 are used to verify the measurement outputs from current measuring units 42, 43 and motor rotation angle sensors 50a, 50b as well as used as backup for failure of these sensors.

Figure 8:
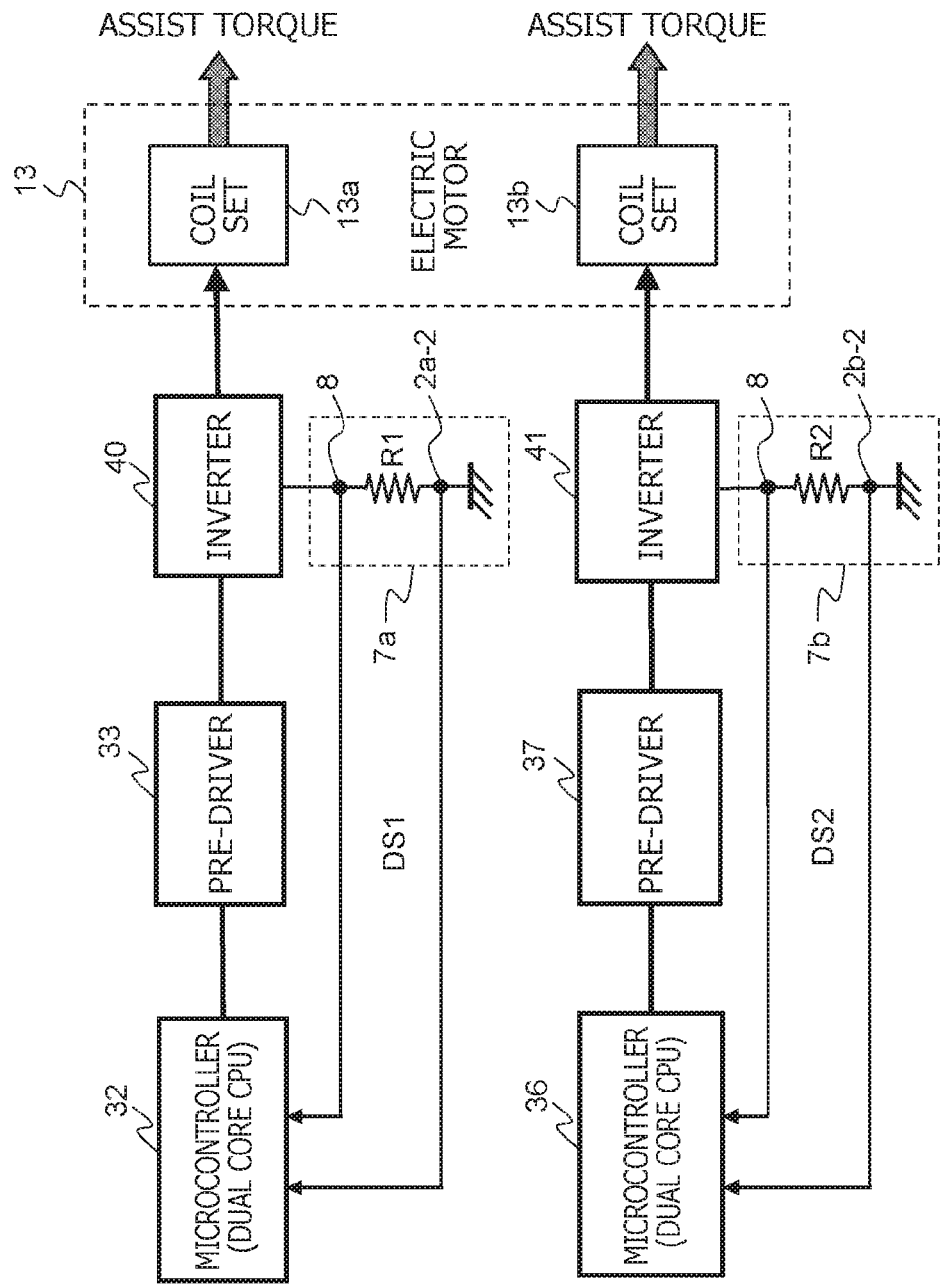
FIG. 8 is a block diagram illustrating a configuration example for ground current monitoring sensors in the EPS ECU of FIGS. 2 and 7.

FIG. 8 illustrates a configuration example for first and second sensors 7a, 7b in EPS ECU 3 of FIGS. 2 and 7. These sensors 7a, 7b are used for ground current monitoring. First sensor 7a is formed of a resistor R1 connected to inverter 40 at a point between ground portion 8 and first negative terminal 2a-2. First sensor 7a outputs, as the output signal DS1, the voltage across resistor R1 to microcontroller 32, and microcontroller 32 measures ground current (abbreviated as "iGND" in the drawings) based on the output signal DS1. In addition, microcontroller 32 also detects an overcurrent or a short circuit in the harness based on the voltage level across resistor R1. As with first sensor 7a, second sensor 7b is formed of a resistor R2 connected to inverter 41 at a point between ground portion 8 and second negative terminal 2b-2. Second sensor 7b outputs, as the output signal DS2, the voltage across resistor R2 to microcontroller 36, and microcontroller 36 measures ground current based on the output signal DS2. In addition, microcontroller 36 also detects an overcurrent or a short circuit in the harness based on the voltage level across resistor R2.

Figure 9:
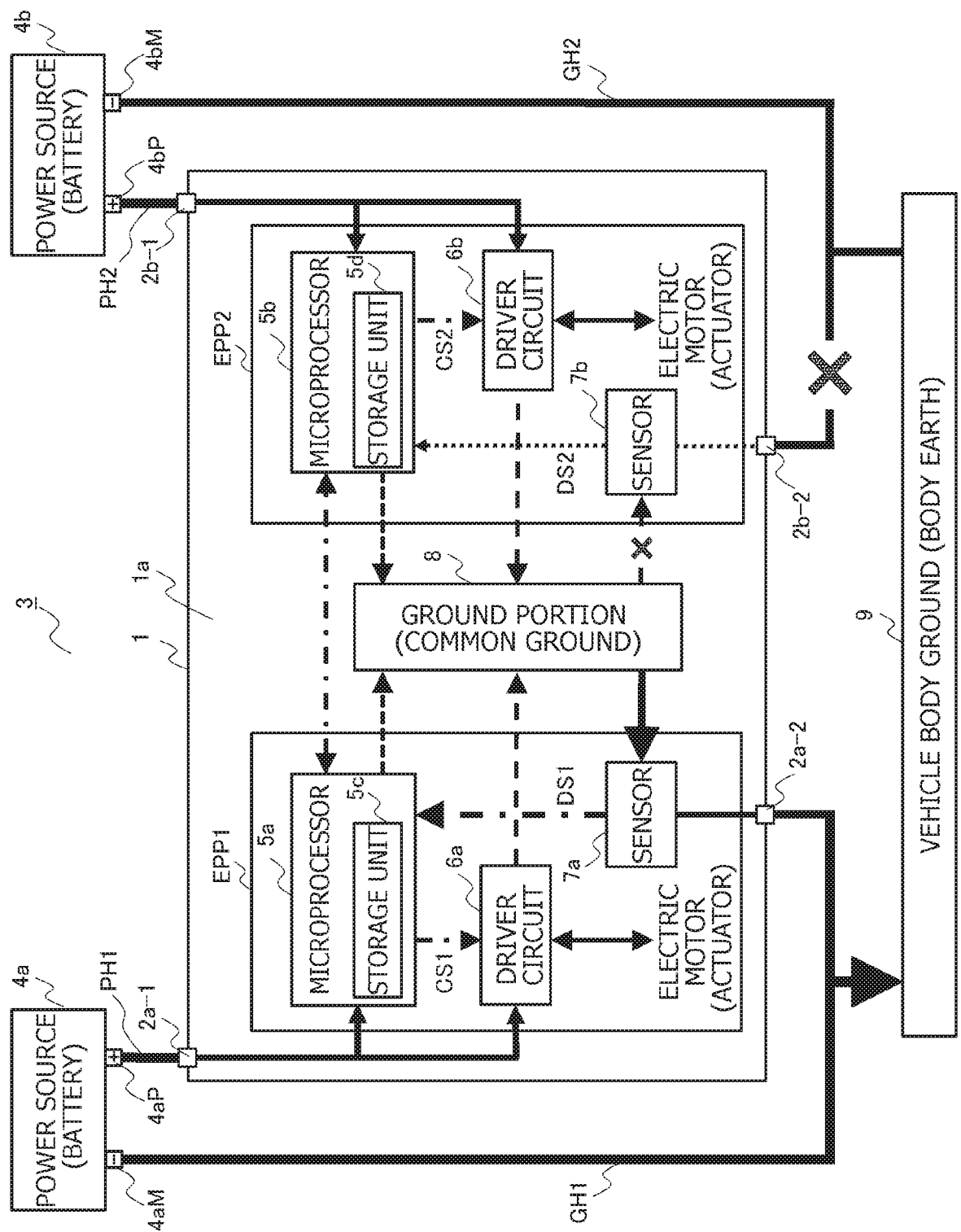
FIG. 9 is a block diagram illustrating a change in ground current expected to occur when ground harness breakage has occurred in the EPS ECU of FIG. 2.

Next, a change in ground current expected to occur when ground harness breakage has occurred in EPS ECU 3 of FIG. 2 will be described with reference to FIG. 9. Assume here that ground harness GH2 connecting negative electrode 4bM of power source 4b with second negative terminal 2b-2 has broken at a point indicated by the cross in FIG. 9. If such breakage of ground harness GH2 has occurred, ground current no longer flows through second-system drive unit EPP2, and the output signal DS2 from (electric-current value monitored by) second sensor 7b becomes zero. Accordingly, upon receiving the output signal DS2 indicating an electric-current value of zero, second microprocessor 5b detects a fault (breakage) of ground harness GH2.

On the other hand, if such breakage of ground harness GH2 has occurred, ground current from the two energizing systems (current having a doubled electric-current value) flows through ground harness GH1 connecting negative electrode 4aM of power source 4a with first negative terminal 2a-2. Accordingly, when first sensor 7a detects such an increase in ground current, first sensor 7a outputs the output signal DS1 indicating the ground current increase to first microprocessor 5a, so that first microprocessor 5a detects a fault (overcurrent fault) of ground harness GH1.

Figure 10:
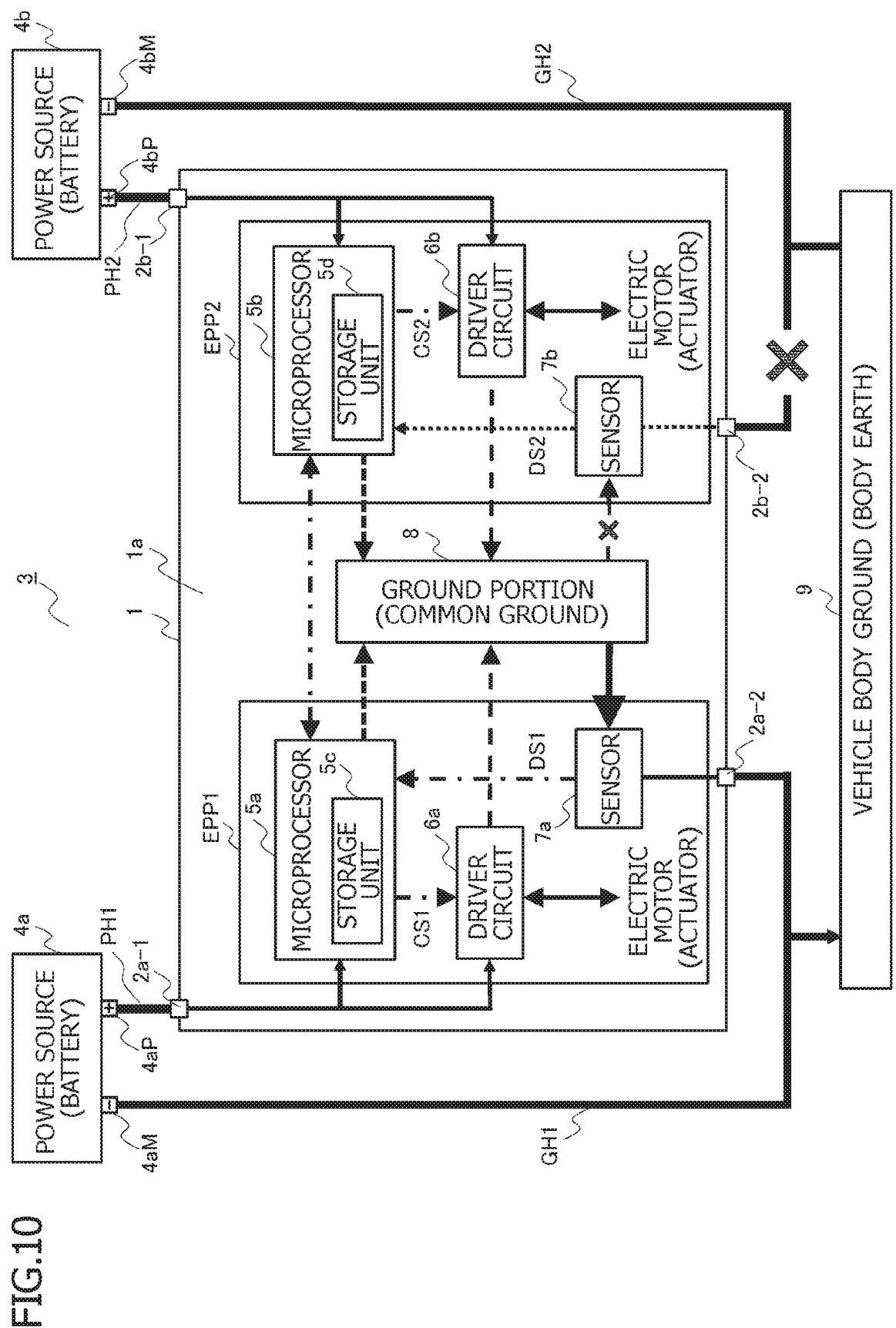
FIG. 10 is a block diagram illustrating an example of control performed in response to ground harness breakage in the EPS ECU of FIG. 2.

FIG. 10 illustrates an example of control performed in response to breakage of ground harness GH2 in EPS ECU 3 of FIG. 2. As shown in FIG. 9, when ground harness GH2 has broken, and thus, first and second sensors 7a, 7b detect abnormal ground current conduction through ground harnesses GH1, GH2, it is determined, through inter-microcomputer communication between first microprocessor 5a and second microprocessor 5b, that ground harness GH2 has broken or the plug of ground harness GH2 has come off from the jack.

When such breakage or accidental unplugging of ground harness GH2 is detected, first microprocessor 5a outputs the first command signal CS1 for controlling first driver circuit 6a such that the motor current supplied from first driver circuit 6a is limited so as not to exceed half the normal value, for example. In addition, second microprocessor 5b outputs the second command signal CS2 for controlling second driver circuit 6b such that the motor current supplied from second driver circuit 6b is limited so as not to exceed half the normal value, for example. In this way, after breakage or accidental unplugging of ground harness GH2, output of the first and second command signals CS1, CS2 from first and second microprocessors 5a, 5b is maintained, but modified so that an increase in ground current flowing through ground harness GH1 is reduced or prevented.

This control ensures that the value of ground current through ground harness GH1, which is not broken, does not exceed the value normally required to drive a single coil set. Therefore, the technique according to this embodiment allows preventing or reducing variations in ground potential, and in addition, allows preventing burnout of any ground harness that may otherwise be caused by unequal ground current distribution when a fault has occurred in the ground portion of the vehicle.

Furthermore, even if one of the ground harnesses has broken or has been unplugged, EPS ECU 3 is able to maintain its functionality with only the loss of independence between their two energizing systems. Accordingly, electric motor 13 continues to be driven by both of drive units EPP1, EPP2 in the two energizing systems. Thus, in case of such a fault, EPS ECU 3 reduces an assist torque output while maintaining its fault detection capability and thus remaining able to perform fault notification effectively to ensure the safety. Furthermore, even in the case of such a fault, microprocessors 5a, 5b, driver circuits 6a, 6b, and sensors 7a, 7b in drive units EPP1, EPP2 in the two energizing systems are maintained in operation. Thus, even if another fault, such as a fault of electric motor 13, occurs in addition to the fault in the ground harness, such an additional fault may be addressed by both microprocessors 5a, 5b, so that a dual fail-safe feature is maintained.

Figure 11:
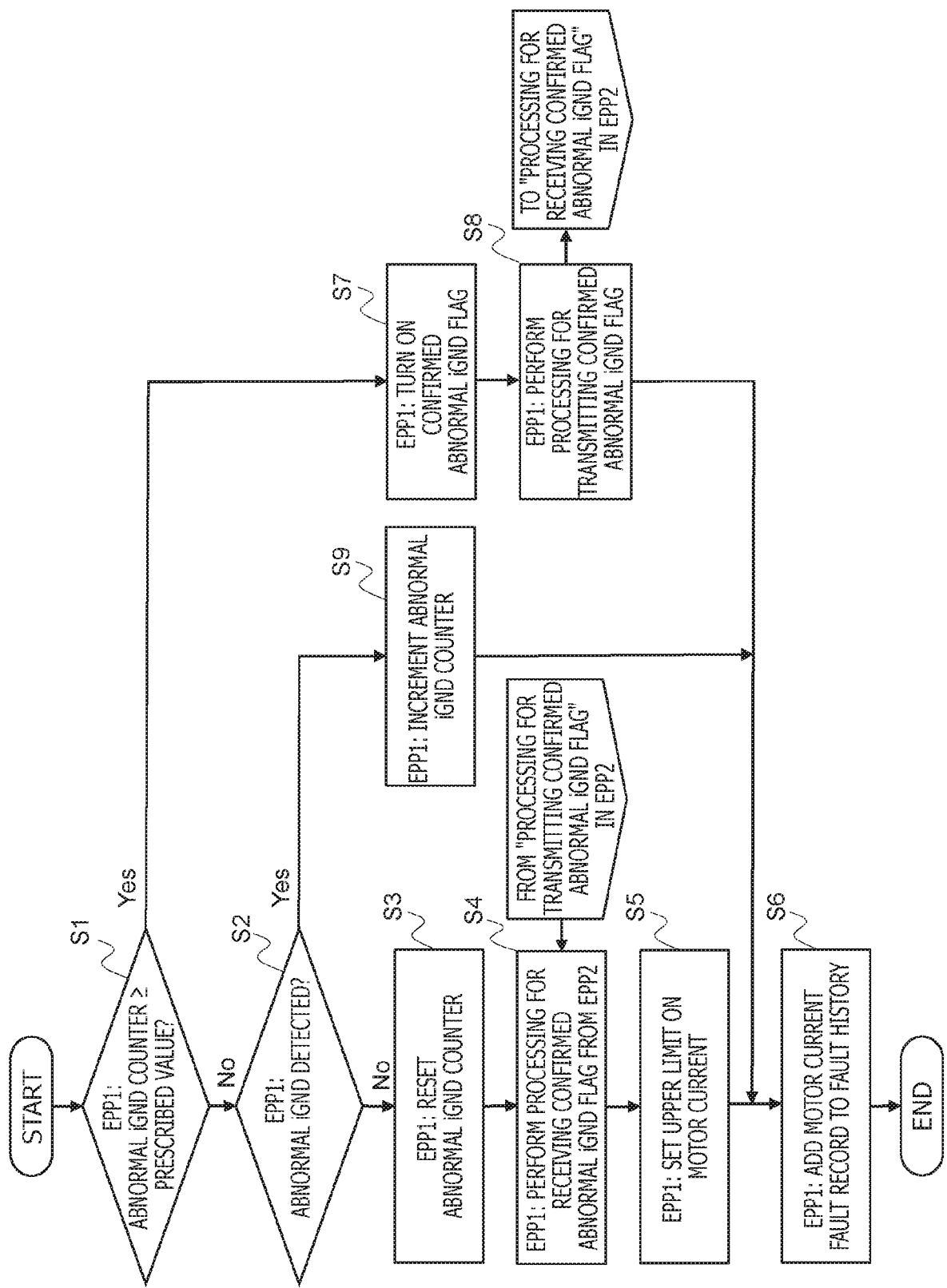
FIG. 11 is a flowchart illustrating abnormal ground current detection operation performed by a first-system drive unit in the EPS ECU of FIG. 2.
Figure 12:
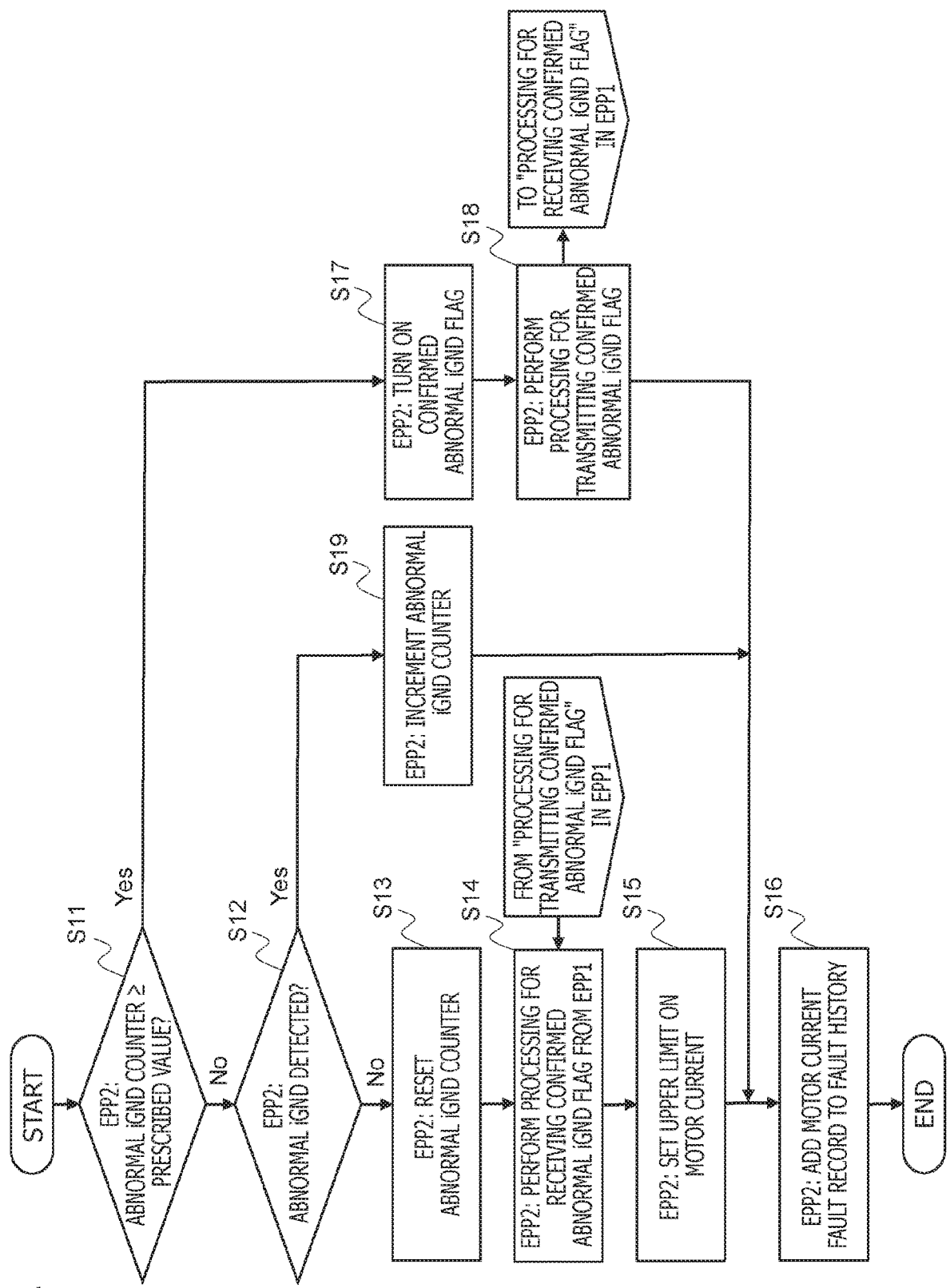
FIG. 12 is a flowchart illustrating abnormal ground current detection operation performed by a second-system drive unit in the EPS ECU of FIG. 2.

Next, the abnormal ground current detection operation as described above, overcurrent detection operation, and short circuit detection operation will be described in detail with reference to the flowcharts of FIGS. 11 to 16. FIG. 11 is a flowchart illustrating the abnormal ground current detection operation performed by first-system drive unit EPP1. FIG. 12 is a flowchart illustrating the abnormal ground current detection operation performed by second-system drive unit EPP2.

As shown in FIG. 11, in first-system drive unit EPP1, first microprocessor 5a first determines whether or not the value of an abnormal ground current conduction counter in first microprocessor 5a is below a prescribed value. When the counter value indicates that the number of occurrences of abnormal ground current conduction through ground harness GH1 is equal to or above the prescribed value, first microprocessor 5a determines that ground harness GH1 has a fault (step S1). When first microprocessor 5a determines that the counter value is below the prescribed value, first microprocessor 5a measures ground current using the output of first sensor 7a, and determines whether the ground current value exceeds a predetermined value, thereby determining whether abnormal ground current conduction is detected (step S2).

When first microprocessor 5a determines in step S2 that the ground current value does not exceed the predetermined value, i.e., determines that the ground current value is within a proper range, first microprocessor 5a resets the abnormal ground current conduction counter therein (step S3).

Then, through inter-microcomputer communication, first microprocessor 5a performs processing for receiving a confirmed abnormal ground current conduction flag from second microprocessor 5b in drive unit EPP2 (step S4). When receiving the confirmed abnormal ground current conduction flag from second microprocessor 5b, first microprocessor 5a sets an upper limit on motor current (step S5). Specifically, in this upper limit setting processing, first microprocessor 5a places a limit on the value of current flowing through coil set 13a of electric motor 13, which is controlled by first microprocessor 5a, by correcting the first command signal CS1 such that motor current supplied from driver circuit 6a does not exceed the maximum allowable current of the harness. More specifically, when receiving the confirmed abnormal ground current conduction flag, first microprocessor 5a limits current (motor current) flowing through coil set 13a so that the value of the current does not exceed half the normal value, for example.

Then, first microprocessor 5a adds a motor current fault record to the fault history in storage unit 5c (step S6), and the operation ends.

On the other hand, when determining in step S1 that the value of the abnormal ground current conduction counter is equal to or above the prescribed value, first microprocessor 5a determines that ground harness GH1 has a fault, and the operation proceeds to step S7. In step S7, first microprocessor 5a turns on a confirmed abnormal ground current conduction flag. Then, first microprocessor 5a performs processing for transmitting the confirmed abnormal ground current conduction flag to second microprocessor 5b in second-system drive unit EPP2 (step S8). As a result, second microprocessor 5b is notified that abnormal ground current conduction has occurred in ground harness GH1 for first-system drive unit EPP1. In this manner, first-system drive unit EPP1 and second-system drive unit EPP2 cooperate to limit motor current such that currents that flow through the ground harnesses do not exceed the maximum allowable currents of the ground harnesses.

After that, the operation proceeds to step S6. In step S6, first microprocessor 5a adds a motor current fault record to the fault history in storage unit 5c, and the operation ends.

On the other hand, when determining in step S2 that the ground current value is out of the proper range, first microprocessor 5a increments the counter value of the abnormal ground current conduction counter (step S9). Then, the operation proceeds to step S6. In step S6, first microprocessor 5a adds a motor current fault record to the fault history in storage unit 5c, and the operation ends.

As shown in FIG. 12, in second-system drive unit EPP2, second microprocessor 5b first determines whether or not the value of an abnormal ground current conduction counter in second microprocessor 5b is below a prescribed value. When the counter value indicates that the number of occurrences of abnormal ground current conduction through ground harness GH2 is equal to or above the prescribed value, second microprocessor 5b determines that ground harness GH2 has a fault (step S11). When second microprocessor 5b determines that the counter value is below the prescribed value, second microprocessor 5b measures ground current using the output of second sensor 7*b*, and determines whether the ground current value exceeds a predetermined value, thereby determining whether abnormal ground current conduction is detected (step S12).

When second microprocessor 5*b* determines in step S12 that the ground current value does not exceed the predetermined value, i.e., determines that the ground current value is within a proper range, second microprocessor 5*b* resets the abnormal ground current conduction counter therein (step S13).

Then, through inter-microcomputer communication, second microprocessor 5*b* performs processing for receiving a confirmed abnormal ground current conduction flag from first microprocessor 5*a* in drive unit EPP1 (step S14). When receiving the confirmed abnormal ground current conduction flag from first microprocessor 5*a*, second microprocessor 5*b* sets an upper limit on motor current (step S15). Specifically, in this upper limit setting processing, second microprocessor 5*b* places a limit on the value of current flowing through coil set 13*b* of electric motor 13, which is controlled by second microprocessor 5*b*, by correcting the second command signal CS2 such that motor current supplied from driver circuit 6*b* does not exceed the maximum allowable current of the harness. More specifically, when receiving the confirmed abnormal ground current conduction flag, second microprocessor 5*b* limits current (motor current) flowing through coil set 13*b* so that the value of the current does not exceed half the normal value, for example.

Then, second microprocessor 5*b* adds a motor current fault record to the fault history in storage unit 5*d* (step S16), and the operation ends.

On the other hand, when determining in step S11 that the value of the abnormal ground current conduction counter is equal to or above the prescribed value, second microprocessor 5*b* determines that ground harness GH2 has a fault, and the operation proceeds to step S17. In step S17, second microprocessor 5*b* turns on a confirmed abnormal ground current conduction flag. Then, second microprocessor 5*b* performs processing for transmitting the confirmed abnormal ground current conduction flag to first microprocessor 5*a* in first-system drive unit EPP1 (step S18). As a result, first microprocessor 5*a* is notified that abnormal ground current conduction has occurred in ground harness GH2 for second-system drive unit EPP2. In this manner, first-system drive unit EPP1 and second-system drive unit EPP2 cooperate to limit motor current such that currents that flow through the ground harnesses do not exceed the maximum allowable currents of the ground harnesses.

After that, the operation proceeds to step S16. In step S16, second microprocessor 5*b* adds a motor current fault record to the fault history in storage unit 5*d*, and the operation ends.

On the other hand, when determining in step S12 that the ground current value is out of the proper range, second microprocessor 5*b* increments the counter value of the abnormal ground current conduction counter (step S19). Then, the operation proceeds to step S16. In step S16, second microprocessor 5*b* adds a motor current fault record to the fault history in storage unit 5*d*, and the operation ends.

In this way, when a fault has occurred in ground portion 8 of the vehicle, first or second sensor 7*a*, 7*b* detects abnormal ground current conduction, and the first and second command signals CS1, CS2 for adjusting motor control variables are output respectively to inverters 40, 41 in first and second driver circuits 6*a*, 6*b* so as to prevent or reduce damage that may otherwise be caused by unequal ground current distribution.

Furthermore, in steps S1, S2, S11, and S12, whether a fault has occurred in the ground harnesses is determined by first and second microprocessors 5*a*, 5*b*. Thus, according to this embodiment, ground harness fault may be detected with software and no additional hardware therefor.

Furthermore, in steps S4, S8, S14, and S18, first-system drive unit EPP1 and second-system drive unit EPP2 cooperate to limit motor current. Thus, the technique according to this embodiment more reliably ensures continuous operation of EPS ECU 3.

Furthermore, in steps S5 and S15, upper limits are set on the motor currents. Thus, the technique according to this embodiment allows continuous operation of EPS ECU 3 while preventing harness burnout, and increases a functional survivability rate for components that are operable with low motor current consumption.

In addition, in steps S6 and S16, occurrence of fault is recorded in the fault history in storage units 5*c*, 5*d*. Thus, the technique according to this embodiment improves serviceability by making it possible to retrieve the fault history with a service tool and thereby to notice any fault in the ground harnesses.

Figure 13:
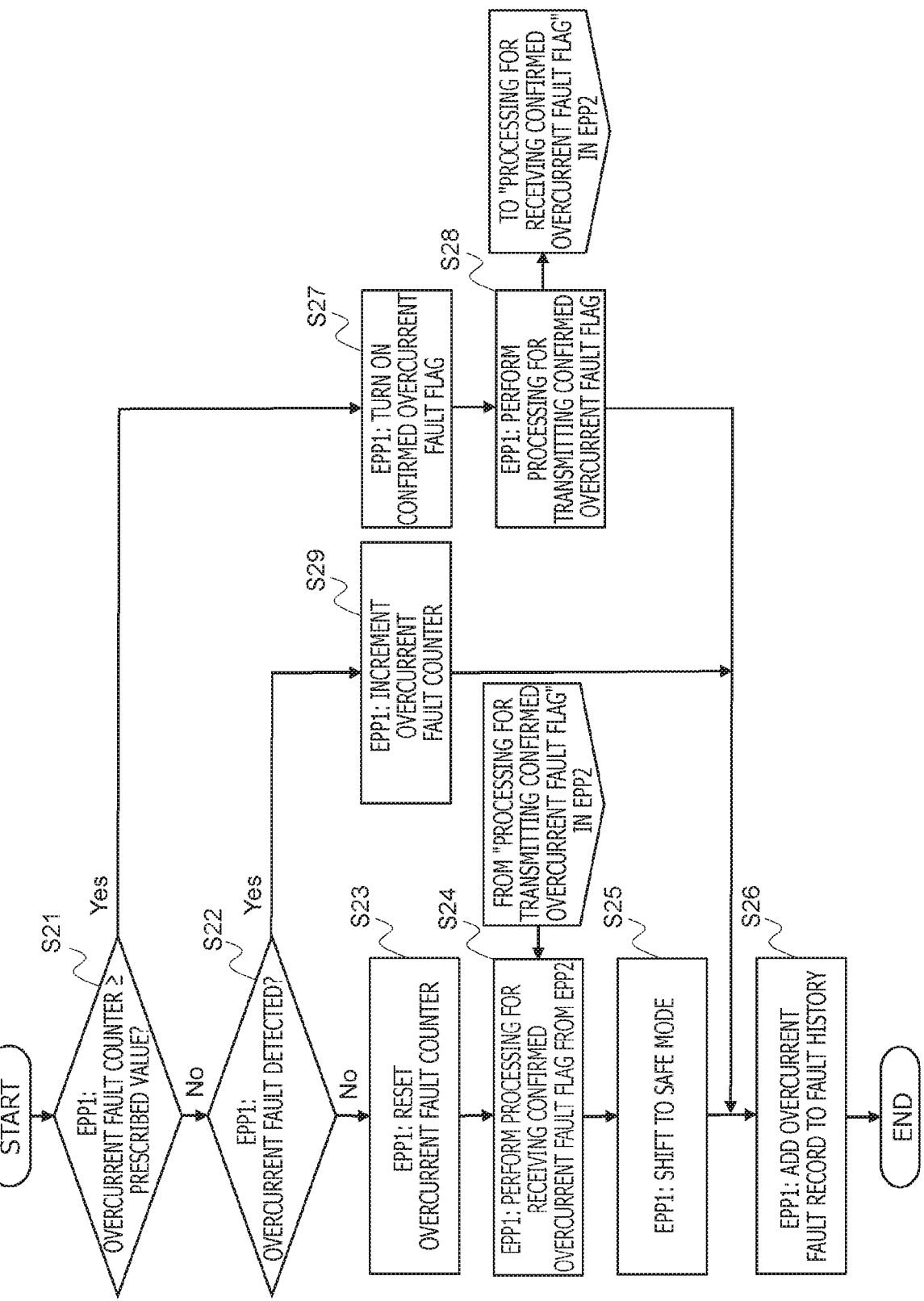
FIG. 13 is a flowchart illustrating overcurrent detection operation performed by the first-system drive unit in the EPS ECU of FIG. 2.
Figure 14:
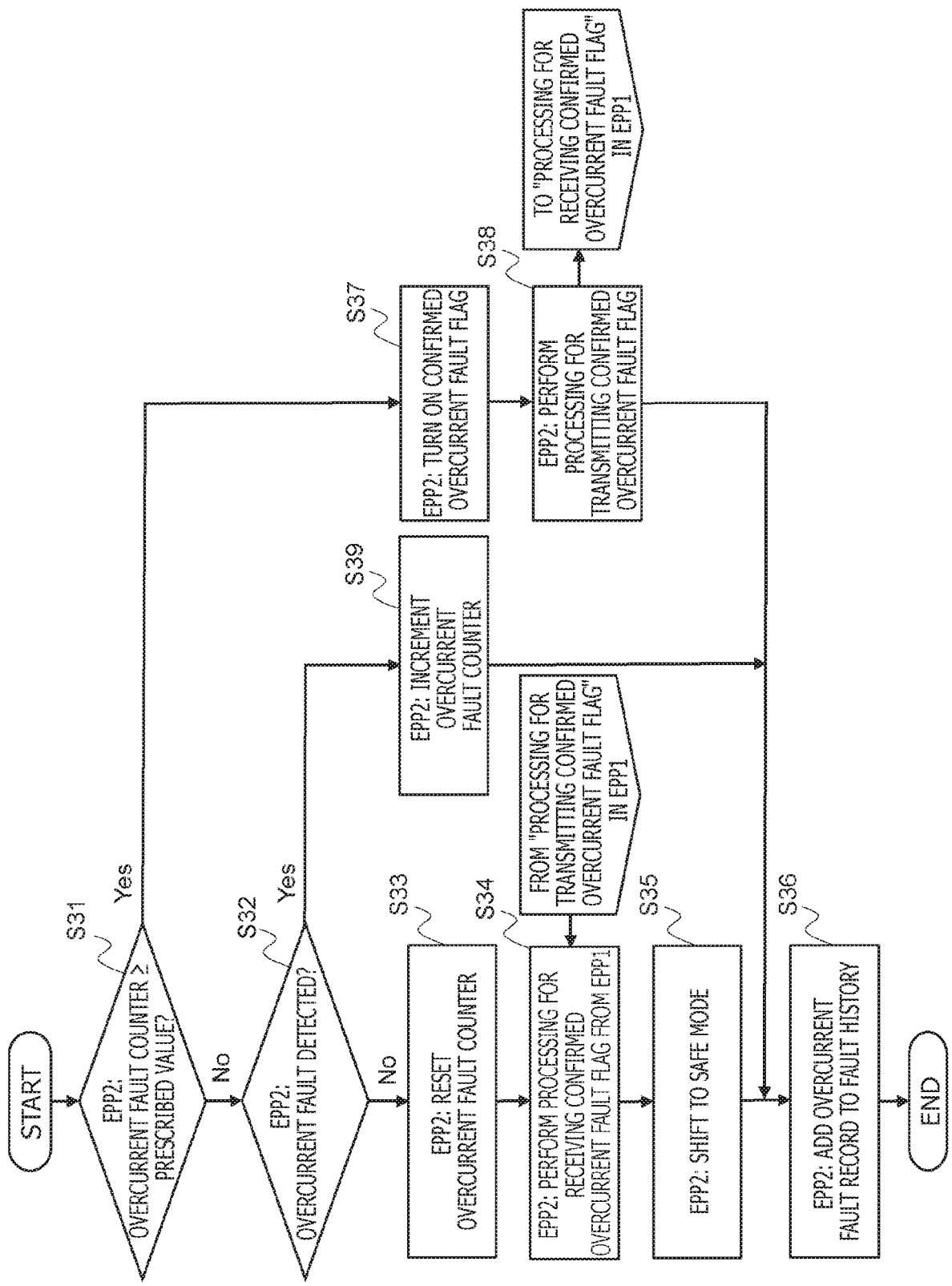
FIG. 14 is a flowchart illustrating overcurrent detection operation performed by the second-system drive unit in the EPS ECU of FIG. 2.

FIG. 13 is a flowchart illustrating the overcurrent detection operation performed by first-system drive unit EPP1. FIG. 14 is a flowchart illustrating the overcurrent detection operation performed by second-system drive unit EPP2. The overcurrent detection operation is performed to respond to a fault (overcurrent fault) that cause an undesirable continuous increase in the motor current. For example, when steering torque sensors 21*a* and/or 21*b* provide false readings due to sensor malfunction, it may be sometimes determined that generated steering torque is insufficient, even though this is not the case. In this situation, such an overcurrent fault may occur as a result of feedback control.

As shown in FIG. 13, in first-system drive unit EPP1, first microprocessor 5*a* first determines whether or not the value of an overcurrent fault counter therein is below a prescribed value. When the counter value indicates that the number of occurrences of significant difference between supply current from power source 4*a* and ground current through ground harness GH1 is equal to or above the prescribed value, first microprocessor 5*a* determines that an overcurrent fault has occurred in EPS ECU 3 (step S21). When first microprocessor 5*a* determines that the counter value is below the prescribed value, first microprocessor 5*a* measures ground current using the output of first sensor 7*a*, and determines whether overcurrent is produced, based on the difference between the ground current and supply current from power source 4*a*, thereby determining whether overcurrent fault is detected (step S22).

When first microprocessor 5*a* determines in step S22 that overcurrent is not produced, i.e., determines that the difference between ground current and supply current is within a proper range, first microprocessor 5*a* resets the overcurrent fault counter therein (step S23).

Then, through inter-microcomputer communication, first microprocessor 5*a* performs processing for receiving a confirmed overcurrent fault flag from second microprocessor 5*b* in drive unit EPP2 (step S24). When receiving the confirmed overcurrent fault flag from second microprocessor 5*b*, first microprocessor 5*a* shifts to a safe mode (step S25). Specifically, in the safe mode shift processing, first microprocessor 5*a* places a limit on the value of current flowing through coil set 13*a* of electric motor 13, which is controlled by first microprocessor 5*a*, by correcting the first command signal CS1 such that motor current supplied from driver circuit 6*a* does not exceed the maximum allowable current of the harness. More specifically, when receiving the confirmed overcurrent fault flag, first microprocessor 5a limits current (motor current) flowing through coil set 13a so that the value of the current does not exceed half the normal value, for example.

Then, first microprocessor 5a adds an overcurrent fault record to the fault history in storage unit 5c (step S26), and the operation ends.

On the other hand, when determining in step S21 that the value of the overcurrent fault counter is equal to or above the prescribed value, first microprocessor 5a determines that overcurrent is produced, and the operation proceeds to step S27. In step S27, first microprocessor 5a turns on a confirmed overcurrent fault flag. Then, first microprocessor 5a performs processing for transmitting the confirmed overcurrent fault flag to second microprocessor 5b in second-system drive unit EPP2 (step S28). As a result, second microprocessor 5b is notified that overcurrent fault has occurred in ground harness GH1 for first-system drive unit EPP1. In this manner, in steps S24 and S28, first-system drive unit EPP1 and second-system drive unit EPP2 cooperate to limit motor current such that currents that flow through the ground harnesses do not exceed their maximum allowable currents.

After that, the operation proceeds to step S26. In step S26, first microprocessor 5a adds an overcurrent fault record to the fault history in storage unit 5c, and the operation ends.

On the other hand, when determining in step S22 that overcurrent is produced, first microprocessor 5a increments the counter value of the overcurrent fault counter (step S29). Then, the operation proceeds to step S26. In step S26, first microprocessor 5a adds an overcurrent fault record to the fault history in storage unit 5c, and the operation ends.

As shown in FIG. 14, in second-system drive unit EPP2, second microprocessor 5b first determines whether or not the value of an overcurrent fault counter therein is below a prescribed value. When the counter value indicates that the number of occurrences of significant difference between supply current from power source 4b and ground current through ground harness GH2 is equal to or above the prescribed value, second microprocessor 5b determines that an overcurrent fault has occurred in EPS ECU 3 (step S31). When second microprocessor 5b determines that the counter value is below the prescribed value, second microprocessor 5b measures ground current using the output of second sensor 7b, and determines whether overcurrent is produced, based on the difference between the ground current and supply current from power source 4b, thereby determining whether overcurrent fault is detected (step S32).

When second microprocessor 5b determines in step S32 that overcurrent is not produced, i.e., determines that the difference between ground current and supply current is within a proper range, second microprocessor 5b resets the overcurrent fault counter therein (step S33).

Then, through inter-microcomputer communication, second microprocessor 5b performs processing for receiving a confirmed overcurrent fault flag from first microprocessor 5a in drive unit EPP1 (step S34). When receiving the confirmed overcurrent fault flag from first microprocessor 5a, second microprocessor 5b shifts to a safe mode (step S35). Specifically, in the safe mode shift processing, second microprocessor 5b places a limit on the value of current flowing through coil set 13b of electric motor 13, which is controlled by second microprocessor 5b, by correcting the second command signal CS2 such that motor current supplied from driver circuit 6b does not exceed the maximum allowable current of the harness. More specifically, when receiving the confirmed overcurrent fault flag, second microprocessor 5b limits current (motor current) flowing through coil set 13b so that the value of the current does not exceed half the normal value, for example.

Then, second microprocessor 5b adds an overcurrent fault record to the fault history in storage unit 5d (step S36), and the operation ends.

On the other hand, when determining in step S31 that the value of the overcurrent fault counter is equal to or above the prescribed value, second microprocessor 5b determines that overcurrent is produced, and the operation proceeds to step S37. In step S37, second microprocessor 5b turns on a confirmed overcurrent fault flag. Then, second microprocessor 5b performs processing for transmitting the confirmed overcurrent fault flag to first microprocessor 5a in first-system drive unit EPP1 (step S38). As a result, first microprocessor 5a is notified that overcurrent fault has occurred in ground harness GH2 for second-system drive unit EPP2. In this manner, in steps S34 and S38, first-system drive unit EPP1 and second-system drive unit EPP2 cooperate to limit motor current such that currents that flow through the ground harnesses do not exceed their maximum allowable currents.

After that, the operation proceeds to step S36. In step S36, second microprocessor 5b adds an overcurrent fault record to the fault history in storage unit 5d, and the operation ends.

On the other hand, when determining in step S32 that overcurrent is produced, second microprocessor 5b increments the counter value of the overcurrent fault counter (step S39). Then, the operation proceeds to step S36. In step S36, second microprocessor 5b adds an overcurrent fault record to the fault history in storage unit 5d, and the operation ends.

In this way, when overcurrent is produced due to a fault in ground portion 8 of the vehicle, first or second microprocessor 5a, 5b detects the overcurrent, and first and second microprocessors 5a, 5b output the first and second command signals CS1, CS2 for adjusting motor control variables respectively to inverters 40, 41 in first and second driver circuits 6a, 6b so as to prevent or reduce damage that may otherwise be caused by unequal ground current distribution.

Furthermore, in steps S21, S22, S31, and S32, overcurrent is detected using first and second sensors 7a, 7b for ground current monitoring. Thus, according to this embodiment, overcurrent may be detected with no additional sensors for overcurrent detection.

Figure 15:
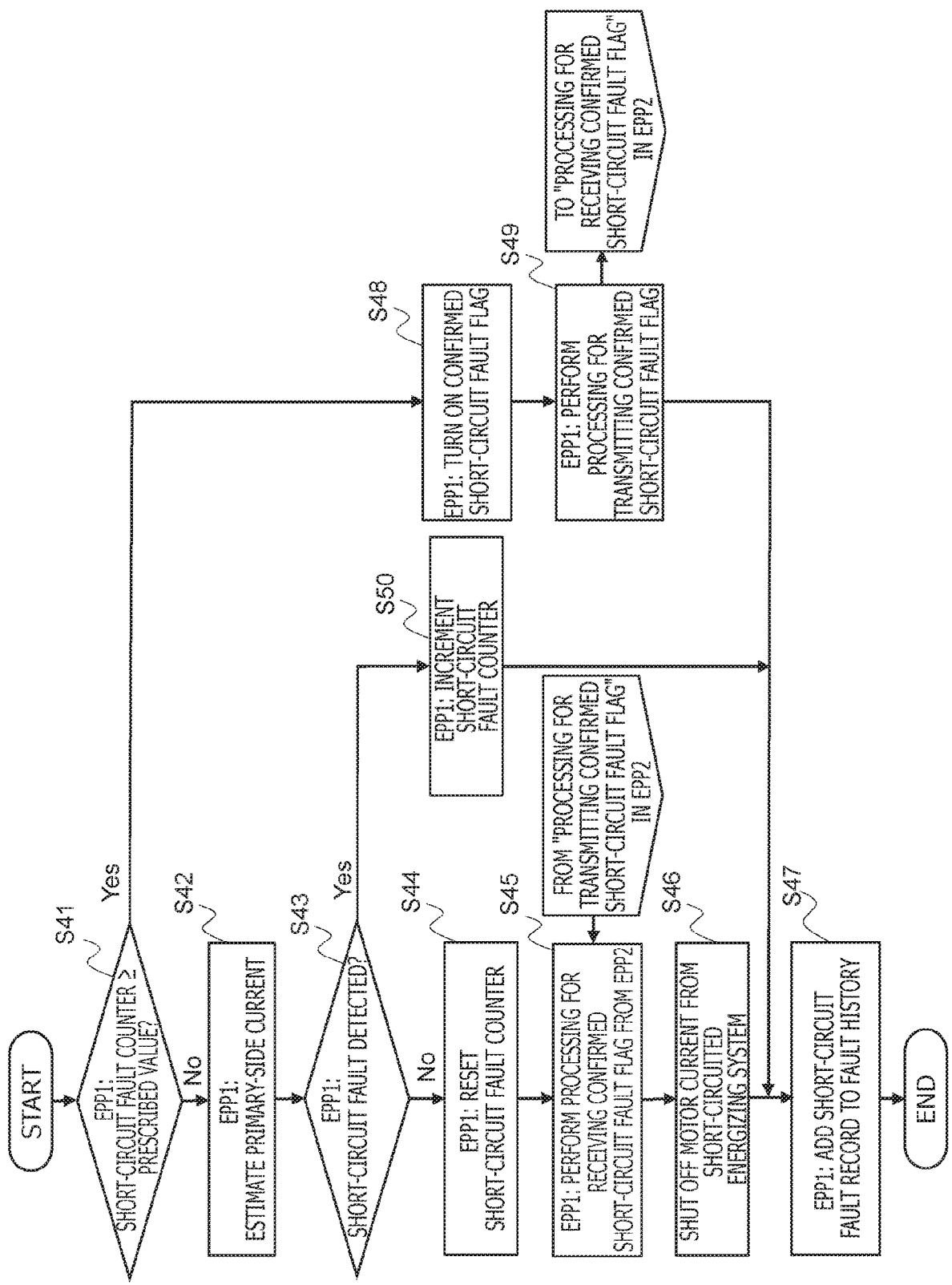
FIG. 15 is a flowchart illustrating short circuit detection operation performed by the first-system drive unit in the EPS ECU of FIG. 2.
Figure 16:
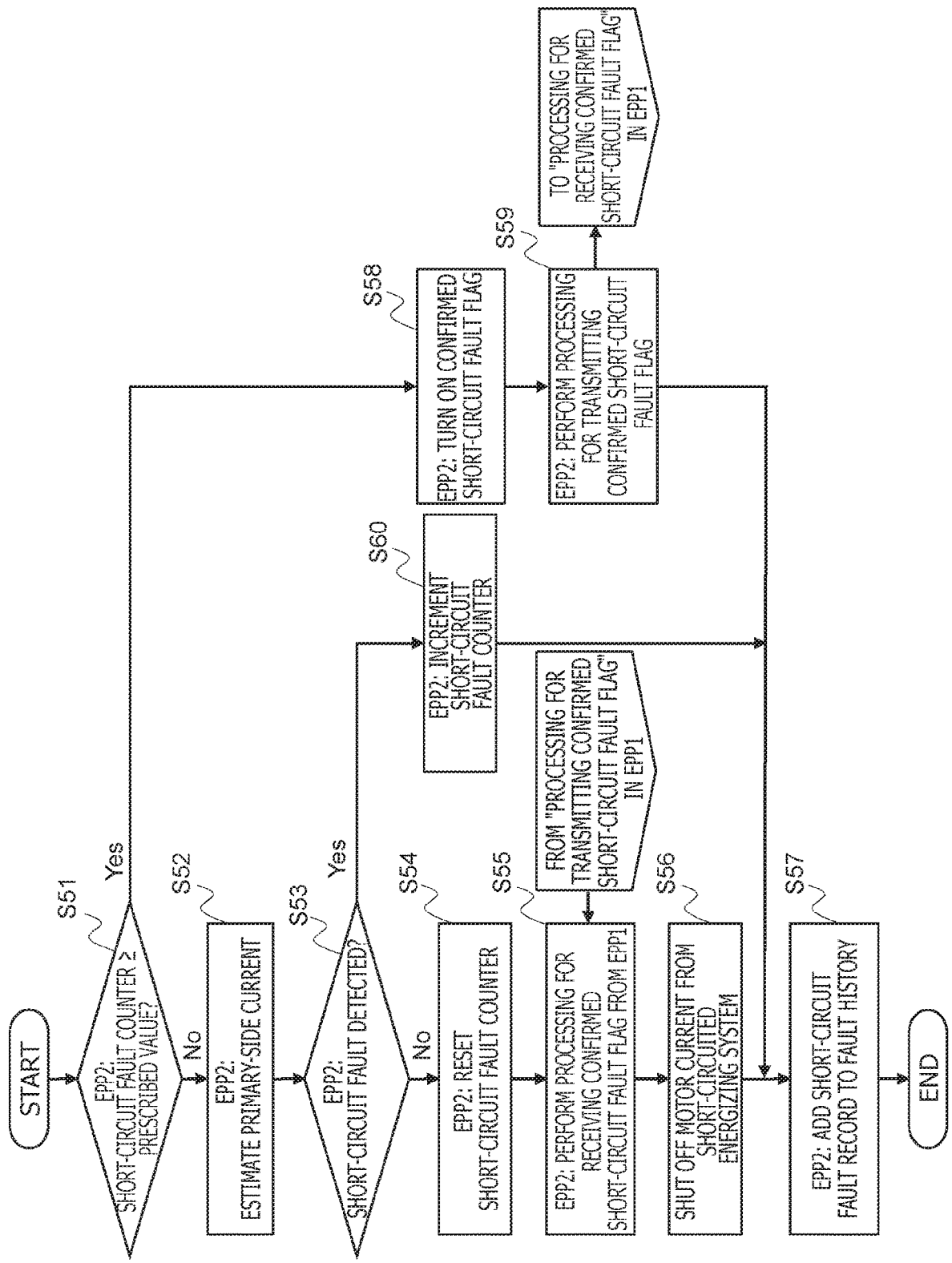
FIG. 16 is a flowchart illustrating short circuit detection operation performed by the second-system drive unit in the EPS ECU of FIG. 2.

FIG. 15 is a flowchart illustrating the short circuit detection operation performed by first-system drive unit EPP1. FIG. 16 is a flowchart illustrating the short circuit detection operation performed by second-system drive unit EPP2.

As shown in FIG. 15, in first-system drive unit EPP1, first microprocessor 5a first determines whether or not the value of a short-circuit fault counter therein is below a prescribed value (step S41). Here, the occurrence of short-circuit fault is determined by first microprocessor 5a based on comparison between the value of ground current measured by first sensor 7a and the value of supply current that flows through coil set 13a of electric motor 13 in accordance with the output from first driver circuit 6a. When the counter value indicates that the number of occurrences of significant difference between the supply current from power source 4a and the ground current is equal to or above the prescribed value, first microprocessor 5a determines that short-circuit fault has occurred in EPS ECU 3. When first microprocessor 5a determines that the counter value is below the prescribed value, first microprocessor 5a estimates the value of primary-side current for coil set 13a (step S42). Specifically, first microprocessor 5a estimates the value of input current (primary-side current) based on the motor phase current for coil set 13a. Then, first microprocessor 5a determines whether short-circuit fault is detected (step S43).

When first microprocessor 5a determines in step S43 that no short-circuit fault has occurred, i.e., determines that the estimated value of the primary-side current is within a proper range, first microprocessor 5a resets the short-circuit fault counter therein (step S44).

Then, through inter-microcomputer communication, first microprocessor 5a performs processing for receiving a confirmed short-current fault flag from second microprocessor 5b in drive unit EPP2 (step S45). When first microprocessor 5a receives the confirmed short-current fault flag from second microprocessor 5b, processing for shutting off motor current from the second energizing system, which has a short-circuit fault, is performed (step S46). Specifically, in the motor current shut-off processing, second microprocessor 5b outputs the second command signal CS2 for shutting off the current supply to coil set 13b of electric motor 13.

Then, first microprocessor 5a adds a short-circuit fault record to the fault history in storage unit 5c (step S47), and the operation ends.

On the other hand, when determining in step S41 that the value of the short-circuit fault counter is equal to or above the prescribed value, first microprocessor 5a determines that short-circuit fault has occurred, and the operation proceeds to step S48. In step S48, first microprocessor 5a turns on a confirmed short-circuit fault flag. Then, first microprocessor 5a performs processing for transmitting the confirmed short-circuit fault flag to second microprocessor 5b in second-system drive unit EPP2 (step S49). As a result, second microprocessor 5b is notified that short-circuit fault has occurred in first-system drive unit EPP1. In this manner, in steps S45 and S49, first-system drive unit EPP1 and second-system drive unit EPP2 cooperate to limit motor current.

After that, the operation proceeds to step S47. In step S47, first microprocessor 5a adds a short-circuit fault record to the fault history in storage unit 5c, and the operation ends.

On the other hand, when determining in step S43 that short-circuit fault has occurred, first microprocessor 5a increments the counter value of the short-circuit fault counter (step S50). Then, the operation proceeds to step S47. In step S47, first microprocessor 5a adds a short-circuit fault record to the fault history in storage unit 5c, and the operation ends.

As shown in FIG. 16, in second-system drive unit EPP2, second microprocessor 5b first determines whether or not the value of a short-circuit fault counter therein is below a prescribed value (step S51). Here, the occurrence of short-circuit fault is determined by second microprocessor 5b based on comparison between the value of ground current measured by second sensor 7b and the value of supply current that flows through coil set 13b of electric motor 13 in accordance with the output from second driver circuit 6b. When the counter value indicates that the number of occurrences of significant difference between the supply current from power source 4b and the ground current is equal to or above the prescribed value, second microprocessor 5b determines that short-circuit fault has occurred in EPS ECU 3. When second microprocessor 5b determines that the counter value is below the prescribed value, second microprocessor 5b estimates the value of primary-side current for coil set 13b (step S52). Specifically, second microprocessor 5b estimates the value of input current (primary-side current) based on the motor phase current for coil set 13a. Then, second microprocessor 5b determines whether short-circuit fault is detected (step S53).

When second microprocessor 5b determines in step S53 that no short-circuit fault has occurred, i.e., determines that the estimated value of the primary-side current is within a proper range, second microprocessor 5b resets the short-circuit fault counter therein (step S54).

Then, through inter-microcomputer communication, second microprocessor 5b performs processing for receiving a confirmed short-current fault flag from first microprocessor 5a in drive unit EPP1 (step S55). When second microprocessor 5b receives the confirmed short-current fault flag from first microprocessor 5a, processing for shutting off motor current from the first energizing system, which has a short-circuit fault, is performed (step S56). Specifically, in the motor current shut-off processing, first microprocessor 5a outputs the first command signal CS1 for shutting off the current supply to coil set 13b of electric motor 13.

Then, second microprocessor 5b adds a short-circuit fault record to the fault history in storage unit 5d (step S57), and the operation ends.

On the other hand, when determining in step S51 that the value of the short-circuit fault counter is equal to or above the prescribed value, second microprocessor 5b determines that short-circuit fault has occurred, and the operation proceeds to step S58. In step S58, second microprocessor 5b turns on a confirmed short-circuit fault flag. Then, second microprocessor 5b performs processing for transmitting the confirmed short-circuit fault flag to first microprocessor 5a in first-system drive unit EPP1 (step S59). As a result, first microprocessor 5a is notified that short-circuit fault has occurred in second-system drive unit EPP2. In this manner, in steps S55 and S59, first-system drive unit EPP1 and second-system drive unit EPP2 cooperate to limit motor current.

After that, the operation proceeds to step S57. In step S57, second microprocessor 5b adds a short-circuit fault record to the fault history in storage unit 5d, and the operation ends.

On the other hand, when determining in step S53 that short-circuit fault has occurred, second microprocessor 5b increments the counter value of the short-circuit fault counter (step S60). Then, the operation proceeds to step S57. In step S57, second microprocessor 5b adds a short-circuit fault record to the fault history in storage unit 5d, and the operation ends.

In this way, when a short-circuit fault has occurred in EPS ECU 3, first or second microprocessor 5a, 5b detects the short-circuit fault, and outputs, to inverter 40, 41 in first or second driver circuit 6a, 6b, the first or second command signal CS1, CS2 for shutting off motor current supply from the energizing system in which the short-circuit fault has occurred, so as to prevent or reduce damage that may otherwise be caused by unequal ground current distribution.

Furthermore, in steps S41 and S51, whether short-circuit fault has occurred is detected by EPS ECU 3. Thus, according to this embodiment, short-circuit fault may be detected with software, depending on intended application.

Furthermore, in steps S42 and S52, short-circuit fault is detected using the primary-side current estimate based on the motor phase current. Thus, according to this embodiment, short-circuit fault may be detected without any dedicated sensor for short circuit detection.

Furthermore, in steps S46 and S56, the motor current supply from the energizing system that has a short-circuit fault is shut off. This prevents harness burnout. In addition, operation of the drive unit in the energizing system that has the short-circuit fault may be maintained after the motor current supply shut-off. Thus, components such as microprocessor 5a, 5b and/or sensor 7a, 7b may be in operation to provide their functions even after fault has occurred.

As described above, according to the present invention, the first and second driver circuits and the first and second microprocessors are connected to the common ground portion shared by the first and second power sources. Thus, variations in ground potential are reduced or prevented. Furthermore, employing such a common ground allows continuous operation of an energizing system even after the ground harness for the energizing system has broken. In addition, employing such a common ground causes the control circuits to have the same ground potentials, and thus improves the degree of freedom in designing the means for establishing communication between the control circuits. Furthermore, wiring harnesses used as power harnesses may be of different types and/or different diameters from those used as ground harnesses, thus ensuring an improved degree of freedom in designing the control device.

In addition, according to the present invention, ground current flowing to the ground portion of the vehicle is monitored using the first and second sensors for detecting abnormal ground current conduction. Furthermore, when abnormal ground current conduction is detected, the command signals for adjusting motor control variables are output respectively to the inverters in the first and second driver circuits. Accordingly, even when a fault has occurred in the ground portion of the vehicle, damage that may otherwise be caused by unequal ground current distribution can be prevented or reduced. As described above, this configuration allows detecting accidental unplugging from the vehicle body ground or breakage of any of the ground harnesses connected to the different energizing systems. Thus, it is possible to prevent all ground current from concentrating at either of the ground harnesses and thus, prevent or reduce burnout of the ground harness.

Accordingly, by applying the present invention to an on-board device configured to use different energizing systems to receive power supply from different power sources, the on-board device is made more robust against any fault in vehicle harnesses, so that the on-board device may perform fault diagnosis at an unchanged or improved accuracy even after occurrence of such a fault. In particular, applying the present invention to a vehicle having automated driving capability provides a highly reliable automated driving system that is able to maintain its operation to continuously provide automated vehicle control even after occurrence of such a fault while the vehicle is in automatic driving mode. This also contributes to the improvement of functional survivability, serviceability, and reliability of the system.

The above embodiment has been described using an example in which the present invention is applied to an EPS ECU. However, as will be understood, the present invention is applicable in similar manner to any other on-board devices.

Furthermore, the above embodiment has been described using an example in which the present invention is applied to an on-board device having redundant configuration having two drive units in two respective energizing systems; i.e., the first-system drive unit and second-system drive unit. However, the present invention is also applicable to an on-board device having other redundant configurations including three or more drive units in three or more respective energizing systems.

In the above description with regard to the flowcharts of FIGS. 11 to 16, the abnormal ground current detection operation, the overcurrent detection operation, and the short circuit detection operation are performed as separate operations. However, overcurrent fault, short-circuit fault, and abnormal ground current conduction may be sequentially detected based on the value of current or voltage between the ground portion and each negative terminal. Furthermore, as will be understood, one or some of the detection operations according to the present invention may be selectively performed as necessary.

In the above embodiment, first and second sensors 7a, 7b for ground current monitoring are formed respectively of resistors R1, R2 connected between the ground portion and inverters 40, 41. However, the present invention is not limited to this, and first and second sensors 7a, 7b may have any configuration as long as they are able to measure current or voltage between the ground portion and first and second negative terminals 2a-2, 2b-2. For example, when the present invention is applied to an on-board device that includes single-shunt based current measuring units, these current measuring units may also be used for ground current monitoring. In this example, it is not necessary to provide any further additional sensors for ground current monitoring.

Hereinafter, technical concepts, which may be understood based on the above embodiment, will be described in association with their effects.

In an aspect of a control device for an on-board device to be installed in a vehicle, the on-board device includes an actuator (electric motor) 13 and that is supplied with power by a first power source 4a and a second power source 4b, and the control device comprises: a housing 1 having an electronic device housing space 1a; a first connector portion 2c provided to the housing 1 and having a first positive terminal 2a-1 adapted to be connected to a positive electrode 4aP of the first power source 4a and a second positive terminal 2b-1 adapted to be connected to a positive electrode 4bP of the second power source 4b; a second connector portion 2d provided to the housing 1 separately from the first connector portion 2c and having a first negative terminal 2a-2 adapted to be connected to a negative electrode 4aM of the first power source 4a or a vehicle grounding member (vehicle body ground 9) and a second negative terminal 2b-2 adapted to be connected to a negative electrode 4bM of the second power source 4b or the vehicle grounding member (vehicle body ground 9); a ground portion 8 formed of an electrically conductive material and housed in the electronic device housing space 1a; a first driver circuit 6a housed in the electronic device housing space 1a, connected between the ground portion 8 and the positive electrode 4aP of the first power source 4a, supplied with power from the first power source 4a, and including a first inverter 40 configured to drive and control the actuator 13; a second driver circuit 6b housed in the electronic device housing space 1a, connected between the ground portion 8 and the positive electrode 4bP of the second power source 4b, supplied with power from the second power source 4b, and including a second inverter 41 configured to drive and control the actuator 13; and a processor housed in the electronic device housing space 1a and including a first microprocessor 5a supplied with power from the first power source 4a and is configured to output a first command signal CS1 for controlling the first inverter 40, and a second microprocessor 5b supplied with power from the second power source 4b and is configured to output a second command signal CS2 for controlling the second inverter 41.

In the above configuration, the first and second negative terminals 2a-2, 2b-2 are provided in the second connector portion 2d, which is provided separately from the first connector portion 2c in which the first and second positive terminals 2a-1, 2b-1 are provided. This limits or prevents first and/or second positive terminals 2a-1, 2b-1 from being short-circuited to first and/or second negative terminals 2a-2, 2b-2.

In a preferred aspect of the control device for an on-board device, a current capacity of the first negative terminal 2a-2 is greater than a current capacity of the first positive terminal 2a-1, and a current capacity of the second negative terminal 2b-2 is greater than a current capacity of the second positive terminal 2b-1.

This configuration is able to address a situation in which one of the negative lines (ground harness GH1 or GH2) has been unplugged and all ground current concentrates at the other negative line. Specifically, since the first and second negative terminals 2a-2, 2b-2 connected to the negative lines have greater current capacities, damage of the first and second negative terminals 2a-2, 2b-2 may be prevented or reduced even in such a situation. It is further preferable to use the negative lines (ground harnesses GH1, GH2) with greater current capacities. On the other hand, in the above configuration, the current capacities of the first and second positive terminals 2a-1, 2b-1 are smaller than those of the first and second negative terminals 2a-2, 2b-2. This prevents or reduces an increase in size and cost of the control device.

In yet another preferred aspect, a cross-sectional area, perpendicular to a mounting direction, of the first negative terminal 2a-2 is larger than a cross-sectional area, perpendicular to the mounting direction, of the first positive terminal 2a-1, and a cross-sectional area, perpendicular to the mounting direction, of the second negative terminal 2b-2 is larger than a cross-sectional area, perpendicular to the mounting direction, of the second positive terminal 2b-1. Here, the mounting direction refers to a direction in which the positive electrode 4aP of the first power source 4a is connected to the first positive terminal 2a-1.

In the above configuration, the first and second negative terminals 2a-2, 2b-2 have larger cross-sectional areas. Accordingly, the first and second negative terminals 2a-2, 2b-2 have larger current capacities. On the other hand, in the above configuration, the cross-sectional areas of the first and second positive terminals 2a-1, 2b-1 are smaller than those of the first and second negative terminals 2a-2, 2b-2. This prevents or reduces an increase in size and cost of the control device.

In yet another preferred aspect, a cross section, perpendicular to a mounting direction, of the first positive terminal 2a-1 differs in shape from a cross section, perpendicular to the mounting direction, of the first negative terminal 2a-2, and a cross section, perpendicular to the mounting direction, of the second positive terminal 2b-1 differs in shape from a cross section, perpendicular to the mounting direction, of the second negative terminal 2b-2. Here, the mounting direction refers to a direction in which the positive electrode 4aP of the first power source 4a is connected to the first positive terminal 2a-1.

In the above configuration, the first positive terminal 2a-1 has a cross-sectional shape different from that of the first negative terminal 2a-2, and the second positive terminal 2b-1 has a cross-sectional shape different from that of the second negative terminal 2b-2. Thus, wiring connection error is prevented.

In yet another preferred aspect, a supply voltage of the first power source 4a differs from a supply voltage of the second power source 4b, the first connector portion 2c includes a first connector 2c-1 for first positive terminal and a first connector 2c-2 for second positive terminal, and first connector 2c-1 for first positive terminal and first connector 2c-2 for second positive terminal are provided to the housing 1 so as to be separate from each other.

The above configuration prevents connecting, by mistake, wrong harnesses to the first and second positive terminals 2a-1, 2b-1 that are configured to receive different supply voltages.

In yet another preferred aspect, the first negative terminal 2a-2 and the second negative terminal 2b-2 are formed of the same electrically conductive material as each other.

This configuration reduces the complexity in producing first and second negative terminals 2a-2, 2b-2.

In yet another preferred aspect, a cross-sectional area, perpendicular to a mounting direction, of the first negative terminal 2a-2 is equal to a cross-sectional area, perpendicular to the mounting direction, of the first negative terminal 2a-2. Here, the mounting direction refers to a direction in which the positive electrode 4aP of the first power source 4a is connected to the first positive terminal 2a-1.

In case of a situation in which one of the negative lines (ground harness GH1 or GH2) has been unplugged and all ground current concentrates at the other negative line, the configuration according to the present invention allows an unchanged value of current to flow through the still-connected negative line regardless of which negative line has been unplugged. Thus, in the above configuration, the negative terminals have the same cross-sectional areas so that, whichever negative line has been unplugged from the negative terminal, the still-connected negative terminal 2a-2 or 2b-2 and negative line may respond in the same way to such a situation. This prevents or reduces damage of first and second negative terminals 2a-2, 2b-2.

In yet another preferred aspect, the first negative terminal 2a-2 and the second negative terminal 2b-2 are adapted to be connected to the same harness connector portion.

In this configuration, the first and second negative terminals 2a-2, 2b-2 are arranged in the same connector portion. This improves the workability of connecting the first and second negative terminals 2a-2, 2b-2 to the connector. Furthermore, arranging the first and second negative terminals 2a-2, 2b-2 in the same connector portion ensures continuous operation of the control device even after first and second negative terminals 2a-2, 2b-2 are short-circuited to each other.

In yet another preferred aspect, the control device for an on-board device further comprises a first sensor 7a and a second sensor 7b. The first sensor 7a is provided between the ground portion 8 and the first negative terminal 2a-2 and is configured to measure current between the ground portion 8 and the first negative terminal 2a-2. The second sensor 7b is provided between the ground portion 8 and the second negative terminal 2b-2 and is configured to measure current between the ground portion 8 and the second negative terminal 2b-2. The processor is configured to detect a fault of the control device based on an output signal DS1 from the first sensor 7a or an output signal DS2 from the second sensor 7b.

According to this configuration, by monitoring the output signals DS1, DS2 from the first and second sensors 7a, 7b, it can be detected whether any of the negative lines (ground harness GH1 or GH2) has been unplugged from the first negative terminal 2a-2 or second negative terminal 2b-2, for example.

In yet another preferred aspect, when a difference between the current measured by the first sensor 7a and the current measured by the second sensor 7b is equal to or above a predetermined value, the processor determines that a fault has occurred in the control device.

Here, the first and second negative terminals 2a-2, 2b-2 are connected to the common ground portion 8. Thus, the above configuration allows determining whether a fault, such as accidental unplugging of any harness, has occurred in the control device, based on the difference between the current measurements of the first and second sensors 7a, 7b.

In yet another preferred aspect, when the processor determines that a fault has occurred in the control device based on the output signal DS1 from the first sensor 7a or the output signal DS2 from the second sensor 7b, the processor corrects the first command signal CS1 or the second command signal CS2 so as to place a limit on a value of current flowing through the actuator 13.

This configuration makes it possible to address a situation in which one of the negative lines has been unplugged and all ground current concentrates at the other negative line. Specifically, in such a situation, by placing a limit on the value of current flowing through the actuator 13, damage of the still-connected negative line may be prevented or reduced. The current flowing through the actuator 13 may be limited either by downwardly correcting the outputs of the first and second command signals CS1, CS2 or by performing limiter processing for placing a limit on the value of the current.

In yet another preferred aspect, the processor includes a storage unit 5c, 5d having a non-volatile memory, and when the processor determines that a contact fault has occurred at the first negative terminal 2a-2 or the second negative terminal 2b-2 in the second connector portion 2d based on the output signal DS1 from the first sensor 7a or the output signal DS2 from the second sensor 7b, a record of the contact fault is stored in the storage unit 5c, 5d.

In the above configuration, a fault in the control device is stored as a record of fault history. This improves the maintainability of the control device during vehicle maintenance in the future.

In yet another preferred aspect, when an indication of at least one of the output signals DS1, DS2 from the first and second sensors 7a, 7b is equal to or above a predetermined value, the processor determines that a fault has occurred in the control device.

In this configuration, the first and second sensors 7a, 7b may be used also to detect overcurrent fault. This eliminates the need to provide any additional current sensor for overcurrent detection.

In yet another preferred aspect, the processor is further configured to determine whether a short-circuit fault has occurred in the electronic device housing space 1a, based on comparison between the output signal DS1 from the first sensor 7a and a value of current that flows through the actuator 13 in accordance with an output from the first driver circuit 6a or comparison between the output signal DS2 from the second sensor 7b and a value of current that flows through the actuator 13 in accordance with an output from the second driver circuit 6b.

The above configuration makes it possible to determine that a short-circuit fault has occurred in the circuit when the measurements of the first and second sensors 7a, 7b observed in response to the output signals from the first and second driver circuits 6a, 6b do not match values of currents that are intended to flow through the actuator 13 in accordance with these output signals.

In yet another preferred aspect, when the processor determines that a fault has occurred in the control device based on the output signal DS1 from the first sensor 7a or the output signal DS2 from the second sensor 7b, the first microprocessor 5a maintains output of the first command signal CS1 and the second microprocessor 5b maintains output of the second command signal CS2.

In this configuration, the first and second microprocessors 5a, 5b are not independent from each other but are connected to a common ground portion. Thus, even in a situation in which one of the negative lines (ground harness GH1 or GH2) has been unplugged, both first and second microprocessors 5a, 5b remain available for operation. This reduces functional loss due to occurrence of fault in the control device.

In yet another preferred aspect, the processor is configured to: estimate, based on the first command signal CS1, a value of current that flows through the actuator 13 in accordance with an output from the first driver circuit 6a; and estimate, based on the second command signal CS2, a value of current that flows through the actuator 13 in accordance with an output from the second driver circuit 6b.

Here, information indicated by the first and second command signals CS1, CS2 are present in the microprocessors. Thus, the above configuration eliminates the additional need for sensing of the values of currents flowing through the actuator 13, the output signals from first and second driver circuits 6a, 6b, or the like.

In yet another preferred aspect, the processor includes an inter-microcomputer communication unit configured to transmit and receive signals between the first microprocessor 5a and the second microprocessor 5b, and when the processor determines that a fault has occurred in the control device based on the output signal DS1 from the first sensor 7a or the output signal DS2 from the second sensor 7b, the processor adjusts the first command signal CS1 so that a value of current flowing through the first negative terminal 2a-2 does not exceed a current capacity of the first negative terminal 2a-2 or adjusts the second command signal CS2 so that a value of current flowing through the second negative terminal 2b-2 does not exceed a current capacity of the second negative terminal 2b-2.

The above configuration ensures continuous operation of the actuator 13 while reducing the risk of damage to first and second negative terminals 2a-2, 2b-2.

In yet another preferred aspect, the processor includes an inter-microcomputer communication unit configured to transmit and receive signals between the first microprocessor 5a and the second microprocessor 5b, the first microprocessor 5a is connected between the ground portion 8 and the positive electrode 4aP of the first power source 4a, and the second microprocessor 5b is connected between the ground portion 8 and the positive electrode 4bP of the second power source 4b.

In the above configuration, the first microprocessor 5a and the second microprocessor 5b are connected to the common ground portion 8 so that the ground level is the same for both. This felicitates establishing inter-microcomputer communication therebetween.

REFERENCE SYMBOL LIST

1 Housing
1a Electronic device housing space
2a-1 First positive terminal
2a-2 First negative terminal
2b-1 Second positive terminal
2b-2 Second negative terminal
2c First connector portion
2c-1 First connector for first positive terminal
2c-2 First connector for second positive terminal
2d Second connector portion 3 EPS ECU
4a First power source
4b Second power source
5a First microprocessor
5b Second microprocessor
5c, 5d Storage unit
6a First driver circuit
6b Second driver circuit
7a First sensor
7b Second sensor
8 Ground portion (Common ground)
9 Vehicle body ground (Grounding member of the vehicle)
10 Electric power steering device
13 Electric motor (Actuator)
21, 21a, 21b Steering torque sensor (Driving condition sensor)
22, 22a, 22b Steering angle sensor (Driving condition sensor)
EPP1 First-system drive unit
EPP2 Second-system drive unit
PH1, PH2 Power harness
GH1, GH2 Ground harness
CS1 First command signal
CS2 Second command signal
DS1 Output signal from first sensor
DS2 Output signal from second sensor

The invention claimed is:

1. A control device for an on-board device to be installed in a vehicle, the on-board device including an actuator and supplied with power by a first power source and a second power source,
the control device comprising:
a housing having an electronic device housing space;
a first connector portion provided to the housing and having a first positive terminal and a second positive terminal,
wherein the first positive terminal is adapted to be connected to a positive electrode of the first power source, and
wherein the second positive terminal is adapted to be connected to a positive electrode of the second power source;
a second connector portion provided to the housing separately from the first connector portion and having a first negative terminal and a second negative terminal,
wherein the first negative terminal is adapted to be connected to a negative electrode of the first power source or a vehicle grounding member, and
wherein the second negative terminal is adapted to be connected to a negative electrode of the second power source or the vehicle grounding member;
a ground portion formed of an electrically conductive material and housed in the electronic device housing space;
a first driver circuit housed in the electronic device housing space and connected between the ground portion and the positive electrode of the first power source,
wherein the first driver circuit is supplied with power from the first power source, and includes a first inverter configured to drive and control the actuator;
a second driver circuit housed in the electronic device housing space and connected between the ground portion and the positive electrode of the second power source,
wherein the second driver circuit is supplied with power from the second power source, and includes a second inverter configured to drive and control the actuator; and
a processor housed in the electronic device housing space and including a first microprocessor and a second microprocessor,
wherein the first microprocessor is supplied with power from the first power source and is configured to output a first command signal for controlling the first inverter,
wherein the second microprocessor is supplied with power from the second power source and is configured to output a second command signal for controlling the second inverter,
wherein a current capacity of the first negative terminal is greater than a current capacity of the first positive terminal, and
wherein a current capacity of the second negative terminal is greater than a current capacity of the second positive terminal.

2. The control device for an on-board device, according to claim 1,
wherein a cross-sectional area, perpendicular to a mounting direction, of the first negative terminal is larger than a cross-sectional area, perpendicular to the mounting direction, of the first positive terminal, the mounting direction being a direction in which the positive electrode of the first power source is connected to the first positive terminal, and
wherein a cross-sectional area, perpendicular to the mounting direction, of the second negative terminal is larger than a cross-sectional area, perpendicular to the mounting direction, of the second positive terminal.

3. The control device for an on-board device, according to claim 1, wherein a cross section, perpendicular to a mounting direction, of the first positive terminal differs in shape from a cross section, perpendicular to the mounting direction, of the first negative terminal, the mounting direction being a direction in which the positive electrode of the first power source is connected to the first positive terminal, and
wherein a cross section, perpendicular to the mounting direction, of the second positive terminal differs in shape from a cross section, perpendicular to the mounting direction, of the second negative terminal.

4. The control device for an on-board device, according to claim 1,
wherein a supply voltage of the first power source differs from a supply voltage of the second power source,
wherein the first connector portion includes a first connector for the first positive terminal and a first connector for the second positive terminal, and
wherein the first connector for the first positive terminal and the first connector for the second positive terminal are provided to the housing so as to be separate from each other.

5. The control device for an on-board device, according to claim 1, the control device further comprising:
a first sensor provided between the ground portion and the first negative terminal and configured to measure current between the ground portion and the first negative terminal; and
a second sensor provided between the ground portion and the second negative terminal and configured to measure current between the ground portion and the second negative terminal, wherein the processor is configured to detect a fault of the control device based on an output signal from the first sensor or an output signal from the second sensor.

6. The control device for an on-board device, according to claim 1,
wherein the processor includes an inter-microcomputer communication unit configured to transmit and receive signals between the first microprocessor and the second microprocessor,
wherein the first microprocessor is connected between the ground portion and the positive electrode of the first power source, and
wherein the second microprocessor is connected between the ground portion and the positive electrode of the second power source.

7. The control device for an on-board device, according to claim 4,
wherein the first negative terminal and the second negative terminal are formed of a same electrically conductive material as each other.

8. The control device for an on-board device, according to claim 4,
wherein a cross-sectional area perpendicular to a mounting direction, of the first negative terminal is equal to a cross-sectional area, perpendicular to the mounting direction, of the first negative terminal, the mounting direction being a direction in which the positive electrode of the first power source is connected to the first positive terminal.

9. The control device for an on-board device, according to claim 5,
wherein when a difference between the current measured by the first sensor and the current measured by the second sensor is equal to or above a predetermined value, the processor determines that a fault has occurred in the control device.

10. The control device for an on-board device, according to claim 5,
wherein when an indication of at least one of the output signals from the first and second sensors is equal to or above a predetermined value, the processor determines that a fault has occurred in the control device.

11. The control device for an on-board device, according to claim 5,
wherein the processor is further configured to determine whether a short-circuit fault has occurred in the electronic device housing space, based on comparison between the output signal from the first sensor and a value of current that flows through the actuator in accordance with an output from the first driver circuit or comparison between the output signal from the second sensor and a value of current that flows through the actuator in accordance with an output from the second driver circuit.

12. The control device for an on-board device, according to claim 5,
wherein the processor includes an inter-microcomputer communication unit configured to transmit and receive signals between the first microprocessor and the second microprocessor, and
wherein when the processor determines that a fault has occurred in the control device based on the output signal from the first sensor or the output signal from the second sensor, the processor adjusts the first command signal so that a value of current flowing through the first negative terminal does not exceed a current capacity of the first negative terminal or adjusts the second command signal so that a value of current flowing through the second negative terminal does not exceed a current capacity of the second negative terminal.

13. The control device for an on-board device, according to claim 8,
wherein the first negative terminal and the second negative terminal are adapted to be connected to a same harness connector portion.

14. The control device for an on-board device, according to claim 9,
wherein when the processor determines that a fault has occurred in the control device based on the output signal from the first sensor or the output signal from the second sensor, the processor corrects the first command signal or the second command signal so as to place a limit on a value of current flowing through the actuator.

15. The control device for an on-board device, according to claim 10,
wherein the processor includes a storage unit having a non-volatile memory, and
wherein when the processor determines that a contact fault has occurred at the first negative terminal or the second negative terminal in the second connector portion based on the output signal from the first sensor or the output signal from the second sensor, a record of the contact fault is stored in the storage unit.

16. The control device for an on-board device, according to claim 11,
wherein when the processor determines that a fault has occurred in the control device based on the output signal from the first sensor or the output signal from the second sensor, the first microprocessor maintains output of the first command signal and the second microprocessor maintains output of the second command signal.

17. The control device for an on-board device, according to claim 11,
wherein the processor is configured to:
estimate, based on the first command signal, a value of current that flows through the actuator in accordance with an output from the first driver circuit; and
estimate, based on the second command signal, a value of current that flows through the actuator in accordance with an output from the second driver circuit.

18. A control device for an on-board device to be installed in a vehicle, the on-board device including an actuator and supplied with power by a first power source and a second power source, the control device comprising:
a housing having an electronic device housing space;
a first connector portion provided to the housing and configured to dispose a first positive terminal and a second positive terminal,
wherein the first positive terminal is adapted to be connected to a positive electrode of the first power source, and
wherein the second positive terminal is adapted to be connected to a positive electrode of the second power source; and
a second connector portion provided to the housing separately from the first connector portion and configured to dispose a first negative terminal and a second negative terminal in the inside of the second connector portion,
wherein the first negative terminal is adapted to be connected to a negative electrode of the first power source or a vehicle grounding member, and wherein the second negative terminal is adapted to be connected to a negative electrode of the second power source or the vehicle grounding member.

* * * * *